(12) United States Patent
Watanabe

(10) Patent No.: US 8,010,557 B2
(45) Date of Patent: Aug. 30, 2011

(54) RETRIEVING METHOD FOR FIXED LENGTH DATA

(75) Inventor: Shinpei Watanabe, Yokohama (JP)

(73) Assignee: IPT Corporation, Kanagawa (JP)

( * ) Notice: Subject to any disclaimer, the term of this patent is extended or adjusted under 35 U.S.C. 154(b) by 563 days.

(21) Appl. No.: 12/140,590

(22) Filed: Jun. 17, 2008

(65) Prior Publication Data

US 2009/0234841 A1    Sep. 17, 2009

(30) Foreign Application Priority Data

Mar. 12, 2008  (JP) .................. 2008-062589

(51) Int. Cl.
  *G06F 7/00*   (2006.01)
  *G06F 17/30*  (2006.01)
(52) U.S. Cl. .................. 707/781; 707/770; 709/221
(58) Field of Classification Search .................. 707/781, 707/791
  See application file for complete search history.

(56) References Cited

U.S. PATENT DOCUMENTS

| | | | |
|---|---|---|---|
| 6,910,118 B2* | 6/2005 | Kagawa | 711/216 |
| 7,178,100 B2* | 2/2007 | Call | 715/210 |
| 7,415,463 B2* | 8/2008 | Testa | 1/1 |
| 2003/0123459 A1* | 7/2003 | Liao | 370/401 |
| 2004/0205056 A1* | 10/2004 | Mori et al. | 707/3 |
| 2007/0194957 A1 | 8/2007 | Watanabe | |

* cited by examiner

*Primary Examiner* — Etienne Leroux
*Assistant Examiner* — Mohammad Rahman
(74) *Attorney, Agent, or Firm* — Alston & Bird LLP

(57) ABSTRACT

IP addresses included in a route table are segmented so as to be able to be retrieved all together, and are retrieved at a high rate. As means for retrieving the IP address, a pointer table 200, a secondary pointer table, a local table, and a route table are provided, and a table with a numerical value comparing function is also provided when the further segmentation is necessary. In the retrieval for the ACL table, a fixed length data table of fixed length data configured in the ACL table is generated, and the ACL table is retrieved by using a retrieving method for retrieving the route table. Such tables are provided with a table manager 600 as means for efficiently composing and managing the table, and managing to prevent the retrieving operation from being obstructed.

14 Claims, 12 Drawing Sheets

RETRIEVING PROCESS FLOW
CHART OF FIXED LENGTH DATA
RETRIEVING APPARATUS

MEMORY CONFIGURATION

FIG.5   ENTRY DATA OF POINTER TABLE AND ENTRY CONTROL DATA OF FIXED LENGTH DATA TABLE

NEXT PROCESS

| | | | | | | | | |
|---|---|---|---|---|---|---|---|---|
| (1) | NO DATA | | | | | | | |
| (2) | RESERVED | | | | | | RESERVED | DEFAULT DATA |
| (3) | BASE ADDRESS OF POINTER TABLE MEMORY | SIZE OF SPT | START BIT POSITION | END BIT POSITION | | | RESERVED | |
| (4) | UPPER BITS OF INDEX OF ROUTE TABLE | SIZE OF LT | START BIT POSITION | END BIT POSITION | MEMORY CONTROL DATA | PTID | | DEFAULT DATA |
| (5) | INDEX OF ROUTE TABLE | | START BIT POSITION | END BIT POSITION | MEMORY CONTROL DATA | PTID | | DEFAULT DATA |
| (6) | INDEX OF ROUTE TABLE | | | | MEMORY CONTROL DATA | PTID | | DEFAULT DATA |
| (7) | RESERVED | | | | | | | |

RETRIEVAL CONCEPTUAL DIAGRAM OF IP V4 ADDRESS BY LPM RULE

EXEMPLARY CONFIGURATION OF COMPUTER SYSTEM

90

RETRIEVING METHOD FOR FIXED LENGTH DATA

BACKGROUND OF THE INVENTION

1. Field of the Invention

The present invention generally relates to a data retrieving apparatus and a data retrieving method. Particularly, the present invention relates to a controlling method, a controlling program, and a control data structure which are provided with a function for retrieving data matching under a specified retrieval rule at a high rate from a database which is a group of fixed length data whose bit length is constant. More specifically, the present invention relates to a communication controlling method; a method, a computer readable media and a data structure for controlling communication that realize a high rate retrieval for a destination route in an inter-network relaying apparatus; and a high rate retrieval executed under a plurality of retrieval rules for a filtering function.

2. Description of the Related Art

In a variety of fields there is the need for realizing a retrieval of desired fixed length data at a high rate from a database. Particularly, in the database used in the inter-network relaying apparatus for determination of relay destination and determination of relay processing, a growing demand exists for, to name a few, retrieval destination addresses using a special retrieval rule, retrieval using a plurality of different retrieval rules, and high rate retrieval.

When retrieving a desired IP (Internet Protocol) address from a route database used for an inter-network relaying apparatus (router, etc.), it is necessary to retrieve the IP address based on the LPM (Longest Prefix Match) rule. The IP address basically comprises a network address and a host address. The length of the network address is indicated as a prefix. The length of the prefix is variable, and by aggregating the IP addresses, the route database is composed. The aggregation is to cause one prefix to be representative for a plurality of the prefixes that have identical higher-order bits. The representative prefix is expressed by the common higher-order bits. As a result, when retrieving the route database including the aggregated IP addresses, it is induced that a plurality of the IP addresses match. The LPM rule is a method in which the IP address that is the longest in a plurality of the matching IP addresses is a matching result. The TCAM (Ternary Content Addressable Memory) is a representative example of a conventional technique for realizing high rate retrieval based on the LPM rule. However, the memory size of a TCAM is not as large as that of a DRAM (Dynamic Random Access Memory). Thus, many TCAMs are necessary to accommodate the route database including a large number of the IP addresses by utilizing the TCAMs. Thus, a large-sized database can not be composed because of the limitations of the power supply and packages. This is a problem.

It is also well known to use a table which is retrieved by a plurality of the retrieval rules and composed with the fixed length data for a router and the like. A table using the ACL (Access Control List) including a filtering function for determining whether or not to transfer is a typical example for using the plurality of the retrieval rules. In one example using the ACL, the ACL is composed with the fixed length data comprising user data and seven elements, including a TOS (Type of Service) of eight bits, a source IP address (32 bits), a destination IP address (32 bits), a protocol (eight bits), a source port (16 bits), a destination port (16 bits), and a control flag of eight bits. The user data is data which becomes a retrieval result when the retrieval result is the match. The fixed length data of the ACL is retrieved by a comparison matching rule (different from the LPM) by a prefix mask for the source IP address and the destination IP address, by a numerical value comparison rule for the source port and the destination port, and by the comparison matching rule for other data; in addition, each fixed length data of the ACL includes a priority order. When the comparison result of all the elements matches, it is acknowledged that the fixed length data matches. If a plurality of the fixed length data match, the fixed length data whose priority order is the highest becomes the retrieval result. In a comparison by the comparison matching rule with the prefix mask, a match determination is executed by comparing each bit by using the prefix mask stored in association with the source IP address and the destination IP address which are parts of the fixed length data of the ACL. In a comparison by the numerical value comparing rule, an unsigned numerical value comparison is executed between the maximum value and the minimum value of the source port and the destination port configured in the fixed length data of the ACL table, and if the port to be compared exists between the maximum value and the minimum value, it is acknowledged that the comparison result is the match. Finally, in a comparison by the comparison matching rule, if all of the TOS, the protocol, and the control flag configured in the fixed length data of the ACL table match with a comparison value, it is acknowledged that the comparison result is the match.

Only the TCAM is included in the conventional technique for retrieving the ACL table in a high rate. In addition, the numerical value comparison can not be executed for the TCAM. Thus, a part which needs the numerical value comparison is divided into a plurality of parts, and a requested functionality is achieved by match-comparing each of the divided parts. Thus, as a result, one fixed length data of the ACL table is divided to a plurality of (a few to a few dozen) pieces of the fixed length data, and is stored in the ACL table. As described above, the retrieval for comparing in a high rate by a plurality of the retrieval rules depends on the TCAM, so that the same problem as the above in the TCAM is also induced.

The inventor of the present invention has already filed a patent application: Japanese Patent Application No. 2006-512434 (International Patent Application No. PCT/JP2004/04641) [Patent Document 1].

[Patent Document 1] Japanese Patent Application No. 2006-512434 (International Patent Application No. PCT/JP2004/04641)

SUMMARY OF THE INVENTION

To solve the above problems, the present invention provide a retrieving method for retrieving the route database by the LPM rule, and a retrieving method for retrieving the ACL (in the present invention, a fixed length data table described as the ACL table) by a plurality of the retrieval rules. The main object is to retrieve in a high rate a large amount of fixed length data which is stored in a route table or the ACL table, and is to provide a method for the retrieving. Meanwhile, the above route database is a fixed length data table which is described as [route table] in the present invention, and the above fixed length data is described as FLD (Fixed Length Data) in the present invention.

Generally, to retrieve a desired fixed length data (a search key in the present invention) from the FLDs in a database is to compare each of the FLDs in the database with the search key. When an FLD matching with the search key is obtained, or the last FLD is compared, the retrieving is terminated. In this method, as the database becomes larger, the retrieval time becomes longer, so that the high rate retrieval can not realized. One of the high rate retrieving methods is the same as such a proposition that the number of the FLDs to be compared with the search key in the database is decreased as much as possible.

The retrieving method proposed in the present invention is to realize a retrieval from the route table based on the LPM rule, and a retrieval from the ACL table by a plurality of the retrieval rules by segmenting the number of the FLDs in the database, and segmenting the number of the FLDs in such a manner that the segmented FLDs are compared with search key at the same time. In the present invention, the FLDs configured in the database are grouped, that is, the number of the FLDs is segmented by using the search key, and a part of the search key. All of the segmented FLDs are stored in one memory location of a memory in which the route table or the ACL table is stored. Thereby, the high rate retrieval can be executed by reading the memory location in which the segmented FLDs are stored, and by comparing the read data with the search key at a time.

The method for segmenting the route table or the ACL table by utilizing the search key and a part of the search key is executed by using a table, which is referred to as a pointer table (PT). A memory device in which the PT is stored can be configured to be in a semiconductor device which is the same as a memory device that stores the route table or the ACL table, or, preferably, in separate memory device realized by separate semiconductor device. Since a pipeline process can be executed by using another memory, the number of retrievals for a unit time is increased as compared with when the identical memory device is used, and the higher rate retrieval can be realized. Hereinafter, a method for retrieving the IP address under the LPM rule by using the PT of the route table and the route table, and a method for retrieving under a plurality of the retrieval rules by using the PT of the ACL table and the ACL table will be described.

The FLD of the route table includes a valid bit, the prefix mask, the IP address, an ID (Identification), and the user data. While the user data is data which becomes a retrieval result along with match information when the retrieval result is the match, the user data may also include data associated with the FLD, which does not become the retrieval result. In the retrieval for the route table, the PT of the route table is read by using the higher n bits of the search key as an address, and as an example, an index of the route table, a PTID, default data, and the like are obtained. Next, the route table is read by using the index of the route table as an address, and a plurality of the FLDs to be compared with the search key are obtained. In this case, a length of the prefix mask of the read FLD is from n+1 to a length of the IP address (32, in the case of IP v4). The IP address of the FLD is compared with the search key by using the prefix mask associated with the IP address (comparison result 1). In addition, the PTID and the ID are compared (comparison result 2). If there are a plurality of FLDs that yield matches to the comparison result 1 and the comparison result 2, the FLD whose length of the prefix mask is the longest in the plurality of the FLDs in which the matches are obtained, is made a match result. The user data of the matching FLD together with the match result becomes a retrieval result. When none of the read FLDs matches, and the default data exists, the match result and also the default data becomes the retrieval result. When none of the read FLDs matches, and the default data does not exist, the retrieval result is "no match". In this case, the retrieval result does not include the default data and the user data. The default data included by the PT is the user data of the IP address, in which the prefix mask part of the higher-order n bits of the IP address is common, and a length of the prefix mask is the longest. Thus, when none of the FLDs matches, the default data is the retrieval result including the match result. An implementation in which the PT does not store the default data is also possible. In such a case, the IP address corresponding to the default data is stored in the route table, and all the IP addresses whose prefix mask parts of the higher-order n bits are common are stored in the route table.

A basic operation for retrieving the ACL table is to divide the fixed length data of the ACL table, compose two or more tables with the divided elements, and sequentially retrieve the tables. That is, this is the retrieving for segmenting by using the tables. The retrieving will be described by an example. The ACL table is configured with two tables, an ACL table 1 and an ACL table 2. The FLDs of the ACL table 1 are the destination IP address, or the source IP address, an index of the ACL table 2, and an ACLID. The FLDs of the ACL table 2 are all the elements excluding the IP address configured in the ACL table 1, the ID, and the user data. The FLDs stored in the ACL table 1 own the priority orders of the LPM rule, and the FLDs stored in the ACL table 2 own the priority orders specified by the ACL. When a plurality of the FLDs match in the retrieval for each table, the user data of the FLD whose priority order is the highest becomes the match result and the retrieval result. When the ACL table 1 is retrieved, the retrieving is executed by the LPM rule.

At the beginning for retrieving the ACL table, the ACL table 1 is retrieved, which stores the destination IP address, or the source IP address configured in the ACL table 1. The retrieving in ACL table 1 is the same as that of the method for the route table. The retrieval order is as follows. The PT of the ACL table 1 is read by using, as an address, the higher-order n bits of the IP address (search key 1) corresponding to the element stored in the ACL table 1 for the search key, and the PTID, the index of the ACL table 1, and the like are obtained. Next, the ACL table 1 is read by using the index of the ACL table 1 as an address. The read FLD and the search key 1 are compared by using the prefix mask (comparison result 1). In addition, the PTID and the ID are compared (comparison result 2). If the valid bits of the FLD are valid, and there are a plurality of the FLDs in which both of the comparison result 1 and the comparison result 2 are the matches, the ACLID and the index of the ACL table 2 of the matching FLD whose priority order is the highest, and the like are obtained. If there is no matching FLD, the retrieving is terminated, and a "no match" result is obtained.

If there is a matching FLD, the next retrieval is carried out. The ACL table 2 is read by using an index of the ACL table 2. Each element of the read FLD and the search key (search key 2), excluding the IP address which is used for the first retrieval, is compared by the corresponding retrieval rule (comparison result 3). In addition, the parts of the ID and the ACLID of the read FLD are compared by the match comparison, and other parts are compared by a largeness comparison (comparison result 4). If the ACLID matches with the ID for the match comparison, and is equal to or larger than the ID for the largeness comparison, it is acknowledged that the ACLID matches with the ID. If there are a plurality of the FLDs for which both of the comparison result 3 and the comparison result 4 are the matches, the user data of the matching FLD whose priority order is the highest and the match result become the retrieval result. If there is no matching FLD, the retrieval is terminated, and a "no match" result is obtained.

According to an embodiment to which the present invention is applied, the retrieval process for the route table in which a large number of IP addresses are stored can be executed by the LPM rule in a time of two to three memory cycles, and the retrieval process for the ACL table in which a large number of pieces of the fixed length data are stored can be executed by a plurality of the retrieval rules in a time of two to three memory cycles. Since the pipeline configuration is available, the number of retrieval processes for one second becomes an enormous number. In addition to the retrieval process, the fixed length data is added, and is deleted, so that intensive process that executed by a host controlling apparatus can be reduced. A fixed length data retrieving apparatus and a fixed length data retrieving and managing apparatus and a managing method and a retrieving method according to the present invention can be applied to a computer program for causing a computer to function as an information processing apparatus to which a fixed length data retrieving method of the present invention is applied in the present invention.

BRIEF DESCRIPTION OF THE DRAWINGS

FIG. 5 is a diagram illustrating formats and contents of entry data of a pointer table, and formats and contents of entry control data of a route table, an ACL table 1, and an ACL table 2 according to the exemplary embodiment of the present invention;

DETAILED DESCRIPTION OF THE PREFERRED EMBODIMENTS

Hereinafter, the preferred exemplary embodiments of the present invention will be specifically described. However, the present invention is not limited to the following exemplary embodiments, and a variety of improvements can be applied without departing from a scope of the principles of the present invention.

[Total Configuration]

Figure 1:
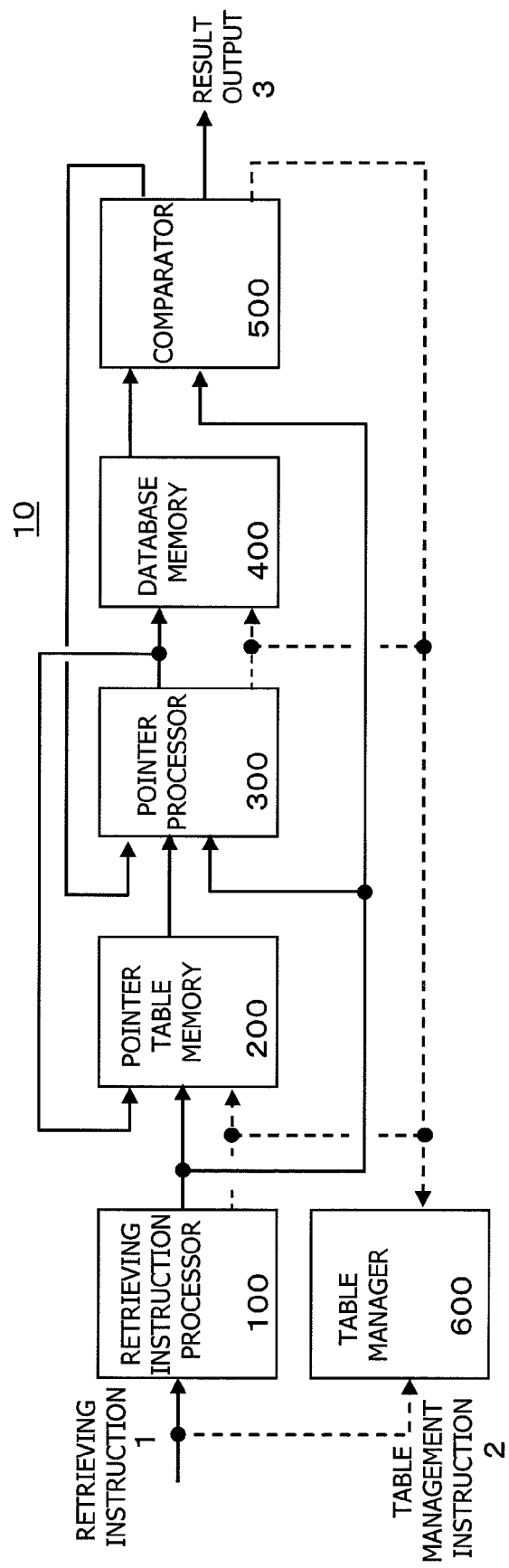
FIG. 1 is a block diagram illustrating an embodiment of a fixed length data retrieving apparatus according to an exemplary embodiment of the present invention.

FIG. 1 illustrates a functional block diagram illustrating an embodiment for retrieving and managing fixed length data according to the present invention.

FIG. 1 is a block diagram illustrating an embodiment according to a fixed length data retrieving method according to the present invention. The fixed length data retrieving apparatus 10 illustrated in FIG. 1 is provided with retrieving instruction processor 100 for executing a specified process for an inputted retrieving instruction 1, a pointer table memory 200 for storing a pointer table indexed by an output of the retrieving instruction processor 100 or an output of pointer processor 300, the pointer processor 300 for calculating an output of comparator 500 or an output of the pointer table memory 200 along with a part of the output of the retrieving instruction processor 100 and outputting a result of the calculation, a database memory 400 for storing a database in which an output of the pointer processor 300 is used as an index, the comparator 500 for comparing a large number of the FLDs outputted by the database memory 400 and a search key included by the retrieving instruction 1 by a specified rule, and table manager 600 for changing tables stored in the pointer table memory 200 and the database memory 400 with an output of the comparator 500 for an inputted table managing instruction 2. It is to be noted that the pointer table memory 200 and the database memory 400 may be configured with a single memory.

Figure 2:
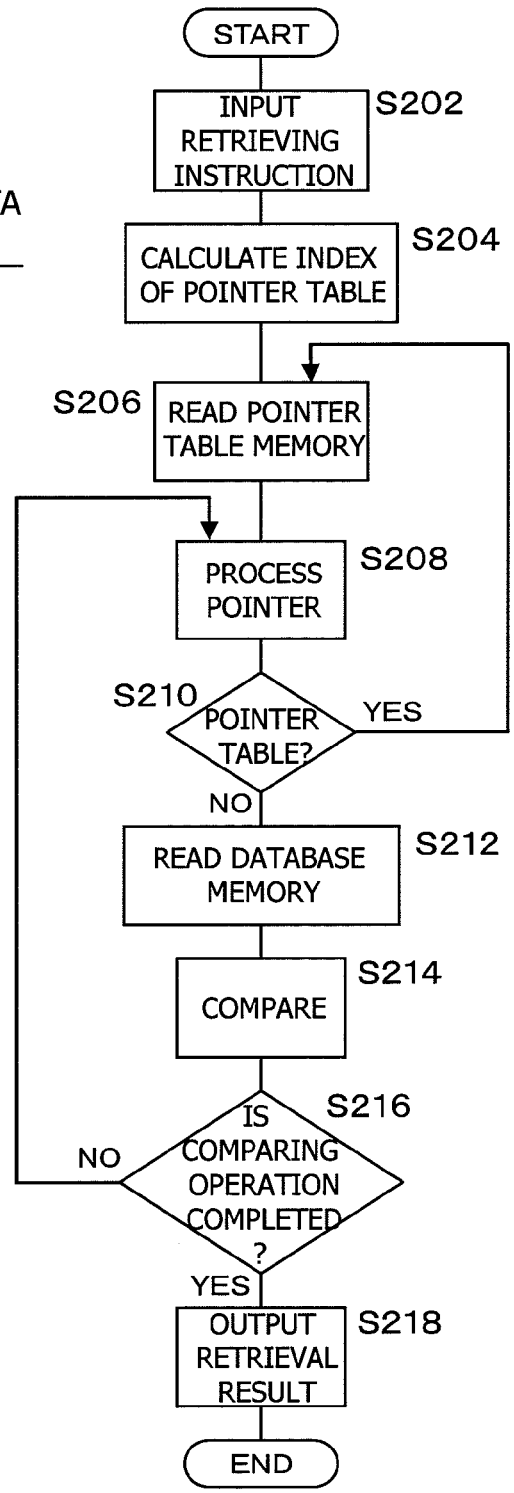
FIG. 2 is a flowchart illustrating an operation of a fixed length data retrieving apparatus 10 according to the exemplary embodiment of the present invention.

FIG. 2 is a retrieving process flow of the fixed length data retrieving apparatus 10 illustrated in FIG. 1. The outline of FIG. 2 will be described. First, the retrieving instruction 1 is inputted (S202). An index of the pointer table is calculated by the retrieving instruction processor 100 from a search key of the retrieving instruction 1 (S204). The pointer table is read (S206). After that, an output of the pointer table is processed by the pointer processor 300 (S208). If the output indicates the pointer table (S210), the pointer table is read again (S206). If an output of the pointer processor 300 indicates that the database is read, the reading is executed (S212). If a comparing operation (S214) is completed by reading the database one time (S216), a retrieval result is outputted (S218). If the comparing operation is not completed (S216 to S208), an address of the table is calculated again by the pointer process, and the table is selected (S210). When a local table is selected, a fixed length data table is read (S212). When the SPT is selected at the selection of the table (S210), the pointer table is read (S206). FIG. 1 includes a method for segmenting a database, which enables two following retrieving methods according to the present invention to operate; a retrieving method for retrieving the route table (database) by the LPM rule, and a retrieving method for retrieving the ACL table (database) by a plurality of retrieval rules; that is, descriptions for reading a plurality of the pointer tables, reading a plurality of the database, and a plurality of readings with a combination of the pointer table and the database. The retrieving method of the present invention will be described in detail below for operations of the fixed length data retrieving apparatus 10 as referring to FIG. 1 and FIG. 2. First, the retrieving method for retrieving the route table by the LPM rule will be illustrated by a 32-bit IP address (IP v4) to understand the essence of the retrieving method.

[Retrieving Instruction Processor]

Figure 3:
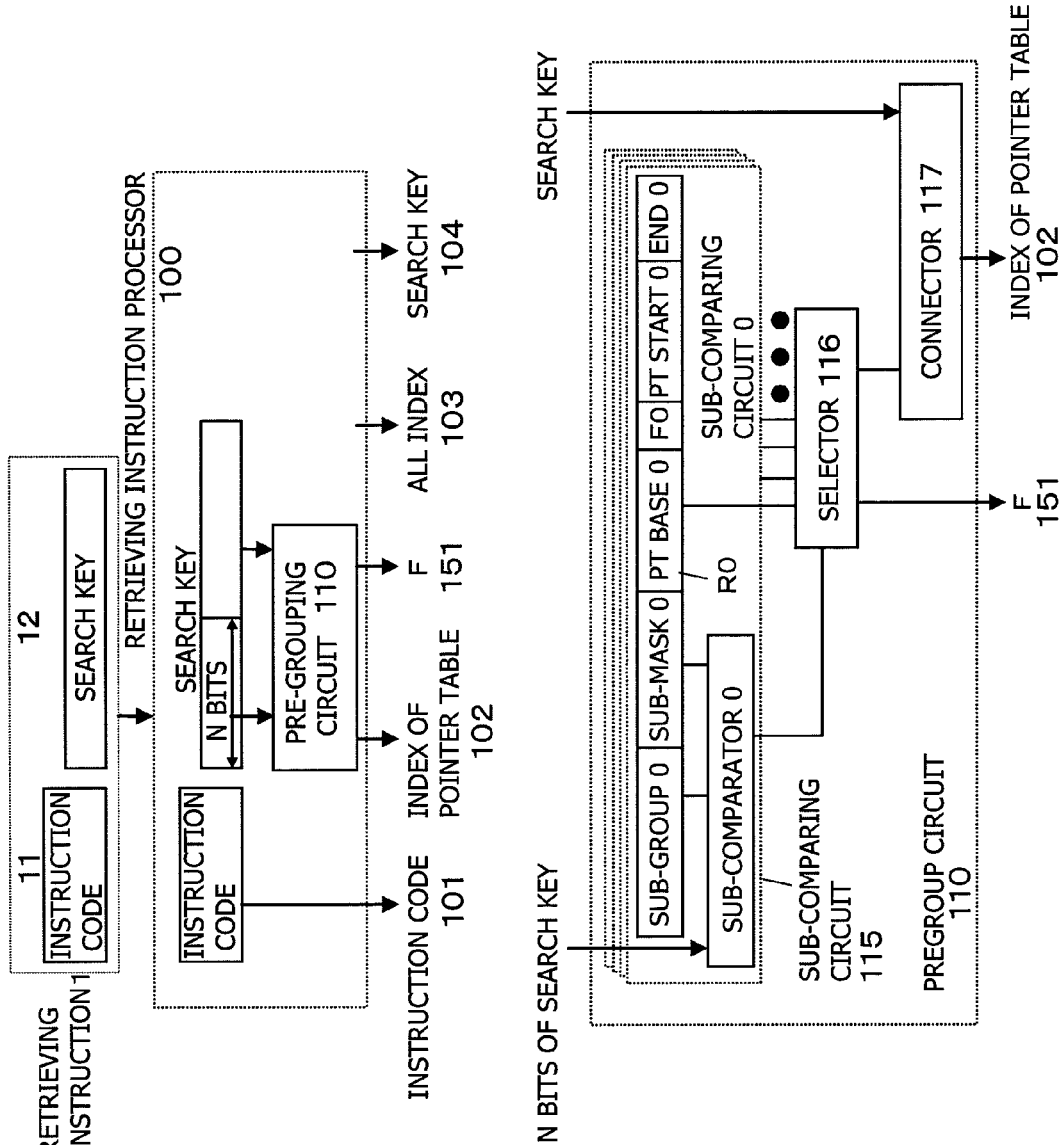
FIG. 3 is a block diagram illustrating a function of retrieving instruction processor 100 configured in the fixed length data retrieving apparatus 10 according to the exemplary embodiment of the present invention.

The retrieving instruction 1 is inputted to the retrieving instruction processor 100. FIG. 3 illustrates a function of retrieving instruction processor 100. The retrieving instruction comprises the IP address to be retrieved (search key 12) and an instruction code 11 for the retrieval. The retrieving instruction processor 100 extracts an index 102 of the pointer table stored in the pointer table memory 200, and outputs an instruction code 101, an all index 103, a search key 104, and an F151. The index 102 to be outputted is the higher-order n bits of the IP address. Meanwhile, while the index 102 is actually a sum of a base address of the pointer table memory 200 and the higher-order n bits of the IP address. For simplicity, the following description also will be based on such an assumption that the index 102 is the higher-order n bits of the IP address. The n can be selected. In FIG. 3, a pregroup circuit 110 directly outputs the higher-order n bits of the inputted search key in the retrieval of the 32 bits IP address. The F151 which is also outputted is not used for a retrieving method for the 32 bits IP address. The all index 103 and the search key 104 are the search key 12 in the retrieval for the route table of the 32 bits IP address. It is assumed that n is 16 for simplicity in the following description. A role of the pointer table is to divide fixed length data (FLD) in the database to groups, and to reduce the number of the FLDs (the number of members) in the group so that the FLDs can be compared at a time.

[Pointer Table Memory]

Figure 4:
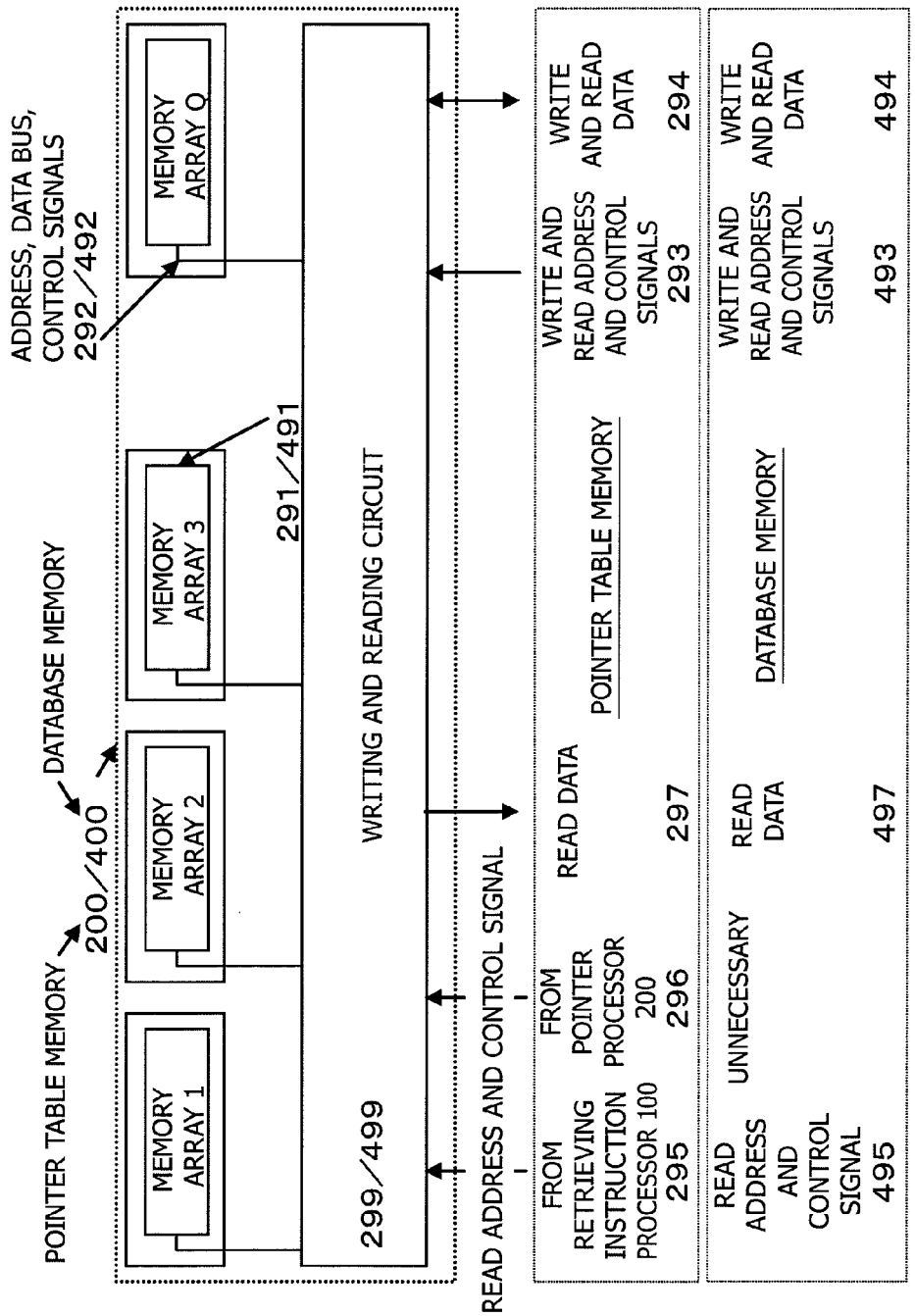
FIG. 4 is a block diagram illustrating a configuration of a pointer table memory 200 configured in the fixed length data retrieving apparatus 10, and a configuration of a database memory 400 configured in the fixed length data retrieving apparatus 10 according to the exemplary embodiment of the present invention.

FIG. 4 illustrates an exemplary configuration of the pointer table memory 200. It is also to be noted that FIG. 4 illustrates an example when a configuration of the pointer table memory 200 is similar to a configuration of the database memory 400. The lower part of FIG. 4 describes the combinations of control signals, addresses, and data when each of the memories is used. Thus, the description of the pointer memory can be also applied to that of the database memory, and the different points will be separately described.

The pointer table memory 200 is configured with a memory part configured with a memory array 291 and a writing and reading circuit 299. The pointer table index 102 (FIG. 3), which is an output of the retrieving instruction processor 100, is used for a memory address 295 of the pointer table memory 200, and read data 297 is outputted to the pointer processor 300.

A writing function is realized by executing a writing instruction provided with a write and read address and control signal 293 and write and read data 294 inputted to the writing and reading circuit 299. Since this writing function in the pointer table memory 200 is a function which is mainly used in the table manager 600, the detailed description will be executed in the description of the table manager 600.

A reading function in the writing and reading circuit 299 can operate as receiving reading instructions from two units (only one reading instruction is received in a writing and reading circuit 499 of the database memory). One of the reading instructions is a reading instruction 295 from the retrieving instruction processor 100, and the other one is a reading instruction 296 from the pointer processor 300. Each of both instructions includes an address and control signals for the memory to be read.

A memory part of the pointer table memory 200 is configured with Q (Q is an integer of one or more) pieces of memory arrays 291. Each of the memory arrays 291 operate independently, and all or a part of a plurality of the memory arrays 291 can operate at a time. The reason why Q pieces of the memory arrays 291 are provided is to increase the amount of data to be written or read together. For example, if it is assumed that the width of a data bus 292 of the memory array 291 is W, the data width of read data 297 and write data 294 becomes W×Q.

[Pointer Processor]

Entry data (read data 297), which is an output of the pointer table memory 200, is inputted to the pointer processor 300 (FIG. 1). An object of the pointer processor 300 is to output the index of the pointer table memory, or the database memory, which is a next process, from the inputted information. The inputs of the pointer processor 300 are the entry data of the pointer table, the all index 103, the instruction code 101, and the F151 which are outputs of the retrieving instruction processor 100, and entry control data of the route table, which is outputted from the database memory 400 through the comparator 500. Since a format of the entry data of the pointer table is the same as that of the entry control data of the route table, both data is just referred to as entry data.

FIG. 5 illustrates contents of the entry data of the pointer table stored in the pointer table memory 200. As illustrated in FIG. 5, the entry data is divided to three largely-classified elements. Such elements are (1) next process, (2) data necessary for the next process, and (3) memory control data (MCD). The MCD is data for controlling memory array 491 configured in the database memory 400 in which the route table to be read next is stored. That is, the MCD includes a function for reading only the memory array 491 in which the FLD is stored.

The entry data of the pointer table includes data for six following next processes.

(1) The entry of the pointer table, which does not include the IP address.
(2) The entry of the pointer table, which includes one IP address.
(3) The pointer table is read again.
(4) The local table (LT) is read, and the comparing operation is executed.
(5) The route table is read, and an NVC (Numerical Value Comparison) is executed.
(6) The route table is read, and the comparing operation is executed.

Such next processes will be described in detail.

When the above (1) is the next process, that is, when the entry of the pointer table does not include the FLD and the default data, the retrieval result of a "no match" is outputted from the comparator 500 through the database memory 400, and the retrieving is terminated. Naturally, the reading operation is not executed by this next process data inputted to the database memory 400, and the corresponding next process data is directly outputted to the comparator 500.

When the above (2) is the next process, that is, when the corresponding entry of the pointer table includes one IP address, i.e., one default data (DEF), the match result and the DEF are outputted from the comparator 500 through the database memory 400. The database memory 400 is not read.

When the above (3) is the next process, that is, when the pointer table is read again, this case means that the entry of the pointer table includes a large number of FLDs, and further segmentation is necessary. As means for the further segmentation, the segmentation is executed by the pointer table. This pointer table is referred to as a secondary pointer table (SPT), which should be distinguished from the first pointer table. The entry of the SPT includes the base address of the pointer table memory 200, a size of the SPT, a start bit position of the all index, and an end bit position of the all index to generate the index of the SPT. The index of the SPT is obtained by combining the base address of the pointer table memory 200 and bits existing from the start bit position to the end bit position of all indexes. The bits existing from the start bit position to the end bit position of the all index are a part which is different from the index of the pointer table, and when this next process is specified by the PT, the start bit position is n+1.

After the index of the SPT is obtained, the pointer table is read again. The following process depends on the entry data of the read SPT.

When the above (4) is the next process, that is, when the local table (LT) is read, and the comparison is executed, the LT composed in the route table is read, and a large number of obtained FLDs are compared. This next process means that this entry of the pointer table includes a large number of the FLDs, and it is necessary that the further segmentation is executed. The LT is one of the means for the further segmentation. The LT is obtained by utilizing a plurality of the entries in the route table as a table. The index of the LT is obtained by combining the higher-order part of the index of the route table and the bits existing from the start bit position to the end position of the all index. The process after obtaining the index of the LT is the same as that after the index of the route table is obtained in the next process of (6). The different points between the LT and the SPT are that the number of times for reading the memory is smaller in the LT, and the SPT can store the default data.

When the above (5) is the next process, that is, when the route table is read, and the NVC (Numerical Value Comparison) is executed, since the entry of the pointer table includes a very large number of the FLDs, it is necessary that the further grouping is executed. This entry data includes the index of the route table, the route table is read based on the index, and the NVC is executed based on the read data. This next process is rarely used. The database is segmented by comparing the numerical values in the NVC. The operations of the NVC will be described in detail in the description of the comparator 500. The next process of this next process is (5) or (6). When (5) is selected, it is anticipated that this entry includes a huge number of the FLDs.

When the above (6) is the next process, that is, when the route table is read, and the comparison is executed, the entry data includes the index of the route table and the memory control data of the database memory 400. The route table is read by using the index, and the read data is compared with the search key. When the route table is read, only the memory array 491, in which the FLDs belonging to this entry are stored, is read by the memory control data. Thereby, the electric power for reading the memory is saved. Generally, the retrieving by the fixed length data retrieving apparatus 10 is almost completed by this next process. After the index of the route table is obtained from this entry data, the route table is read. The obtained entry of the route table is transferred to the comparator 500, and the comparison result is obtained. Then the next process of the read entry data should be (1). The retrieving method for the route table is described by the next processes (1), (2), and (6). In the other processes (3), (4), and (5), the number of the FLDs relating to the entry of the pointer table is segmented. While it is not described in FIG. 5, the next process can be considered in which the NVC operation is executed by using the PT, the SPT, and the LT. Such a description will be omitted. The next process (7) will be described in the retrieving for the ACL table. The default data includes a bit for determining whether or not the default data is valid.

Figure 6:
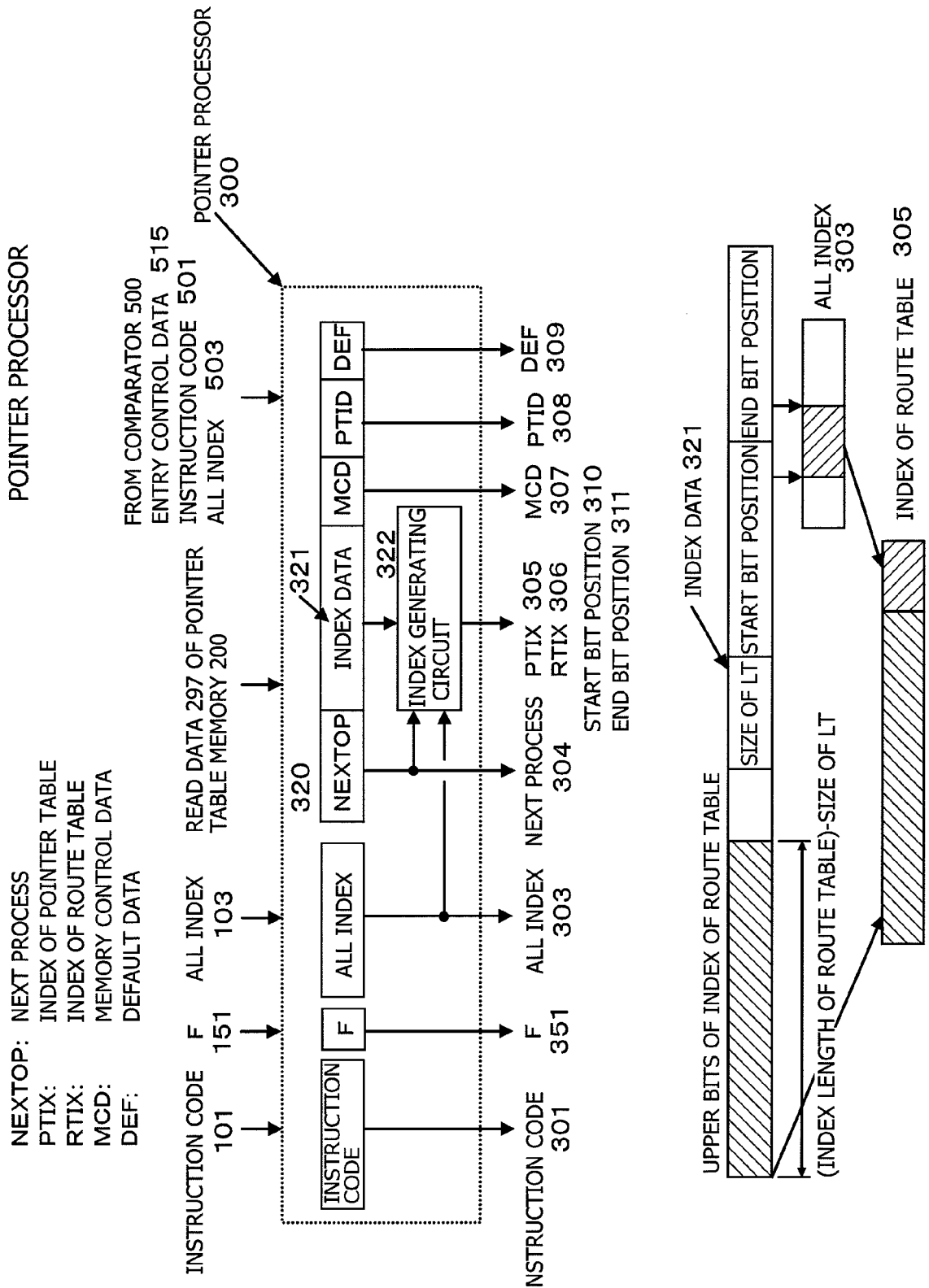
FIG. 6 is a block diagram illustrating a function of pointer processor 300 configured in the fixed length data retrieving apparatus 10 according to the exemplary embodiment of the present invention.

FIG. 6 illustrates the pointer processor 300. As illustrated in FIG. 6, the pointer processor 300 receives the input, and outputs an index 305 of the pointer table when the next process of the entry data is (3), and outputs an index 306 of the route table when the next processes are (4), (5), and (6). Index data 321 illustrated in FIG. 6 indicates the index of the route table when the next processes are (5) and (6), the base address of the pointer table memory 200, the size of the SPT, the start bit position, the end bit position when the next process is (3), and the higher bits of the index of the route table, the size of the LT, the start bit position, the end bit position when the next process is (4). An index generating circuit 322 generates an index (PTIX) 305 of the pointer table and an index (RTIX) 306 of the route table by using the index data 321, a next process 304, and an all index 303. When the next processes are (3) and (4), the functions of the next processes (3) and (4) are the same, the next process (4) will be described. The index generating circuit 322 extracts bits obtained by subtracting the size of the LT from an index length of the route table in the higher bits of [the higher bits of the index of the route table], extracts a part from the start bit position of the all index to the end bit position of the all index, and combines the former to the higher bit position, and the latter to the lower bit position, thereby, generates the RTIX 306. When the next processes are (5) and (6), the index generating circuit 322 directly outputs the index data 321 to the RTIX 306. The pointer processor 300 outputs the inputted information such as the next process 304, an MCD 307, a PTID 308, a DEF 309, a start bit position 310, and end bit position 311, and outputs the inputted information such as an instruction code 301, the all index 303, and an F 351 at the same timing as that of the next process 304, and the like through a delay circuit. Such signals and data are transferred to the database memory 400, and are transferred along with read data 497 of the database memory 400 to the comparator 500. The instruction code 301 is used as a synchronization signal for the comparator 500.

[Database Memory]

Figure 7:
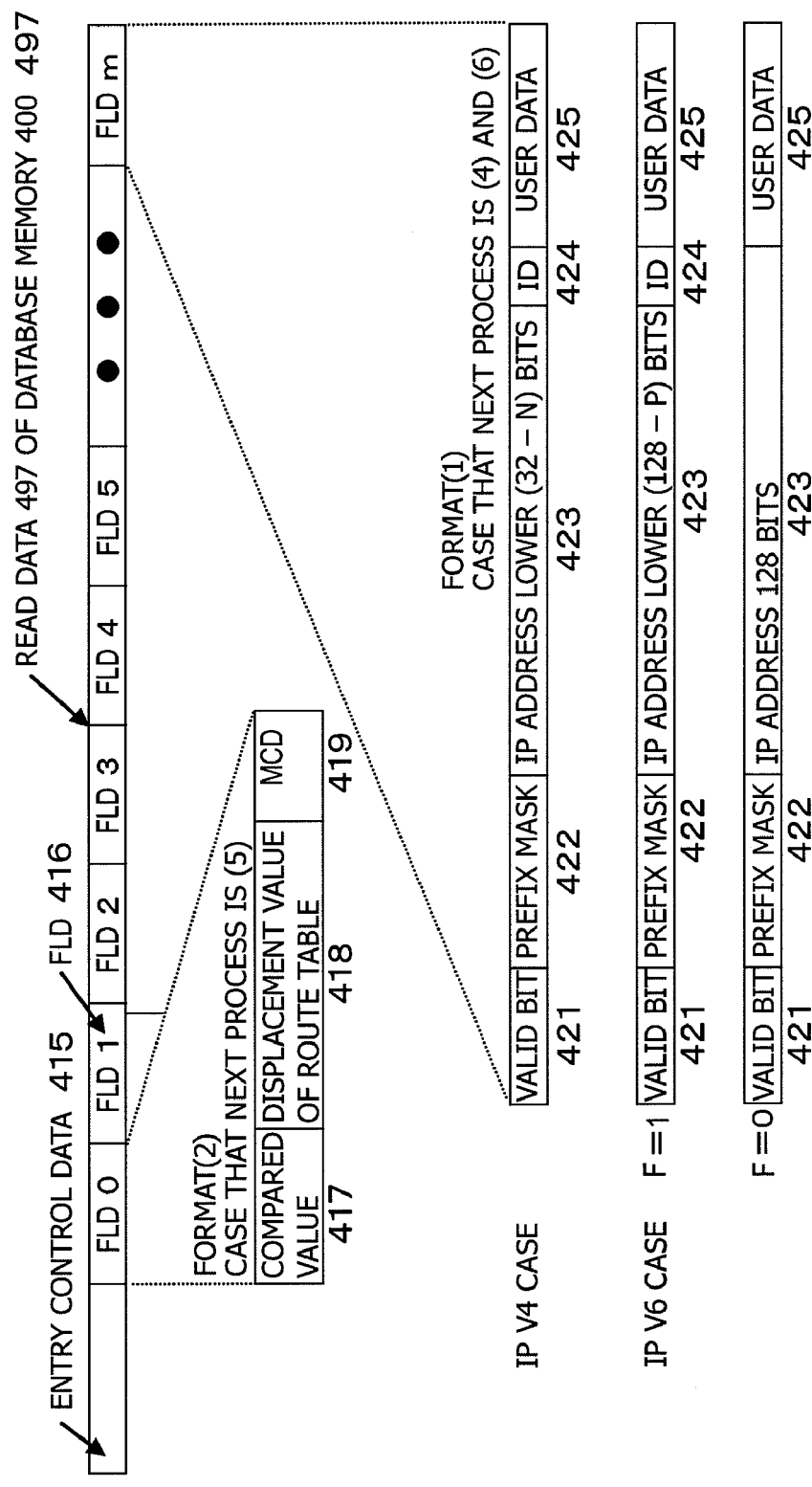
FIG. 7 is a diagram illustrating contents of the route table according to the exemplary embodiment of the present invention.

FIG. 4 illustrates an exemplary configuration of the database memory 400 (FIG. 1). The description of the database memory 400 is the same as that of the pointer table memory 200, so that the description will be omitted. A configuration of the route table stored in the database memory 400 will be described. FIG. 7 illustrates a configuration of an FLD 416 of the route table. Two types of formats exist for the FLD 416 of the route table, and are determined by the previous next process (reading request for the database memory 400). One of the two types of formats is a format (1) when the comparing operation of the previous next processes (4) or (6) is instructed, and the other type is a format (2) when the NVC operation of the previous next process (5) is instructed. The format (1) comprises valid bits 421, a prefix mask 422, an IP address lower (32−n) bits 423, an ID 424, and user data 425. The n is a length of the index 102 of the pointer table. The format (2) comprises a compared value 417, a displacement value 418 of the route table, and an MCD 419. The FLD 416 of the format (1) is stored in the descending order of a length of the incorporated prefix mask 422. In an example of FIG. 7, the Formula 1 is true.

$$LOP\_FLDm \geq LOP\_FLDm-1 \geq \cdots \geq LOP\_FLD0 \quad \text{Formula 1}$$

The LOP_FLDm means a length of the prefix mask 422 incorporated by the FLDm. Likely, the Formula 2 is true for the compared value 417 of the format (2).

$$\text{Compared value } FLDm \geq \text{compared value } FLDm-1 \geq \cdots \geq \text{compared value } FLD0 \quad \text{Formula 2}$$

The compared value FLDm is the compared value 417 incorporated in the FLDm. The compared value is treated as an unsigned value.

A format of entry data 415 is the next processes (1), (5), and (6) illustrated in FIG. 5, and does not include the default data. The memory control data accompanying the next process (5) indicates that all the memory arrays are valid. The memory control data accompanying the next process (6) indicates that only the memory array in which the FLD is stored is valid, and the following next process is constantly (1). Thus, even if the memory array in which the memory control data is stored can not be read, no problem is induced.

The number of FLDs included in the read data 497 of the database memory 400 will be described. In FIG. 4, as an example, if it is assumed that a data bus width of the memory array 491 is 576 bits, and the number of the memory arrays 491 is four, a width of the read data 497 is 2304 bits. If it is assumed that a length of the user data is 32 bits, a length of the FLD of the format (1) is 64 bits or less. If it is assumed that a length of the compared value 417 is 16 bits, a length of the FLD of the format (2) is 32 bits or less. That is, in this example, in the case of the format (1), the number of the FLD which are read all together is 32, and in the case of the format (2), the number of the FLD which are read all together is 64. Such numbers of FLDs can be compared all together.

[Comparator]

The read data 497, which is an output of the database memory 400, is inputted to the comparator 500. Objects of the comparator 500 are to compare the FLD of the inputted read data with a previously-stored search key 504 of an output of the retrieving instruction processor 100 (comparing operation), and output an result obtained by the comparing when next process 404 is (4) or (6), and to compare the largeness of an extracted index extracted from an all index 403 outputted from the pointer processor 300, and determine the next process depending on the next process of the entry control data of the read data 497 when the next process 404 is (5).

Figure 8:
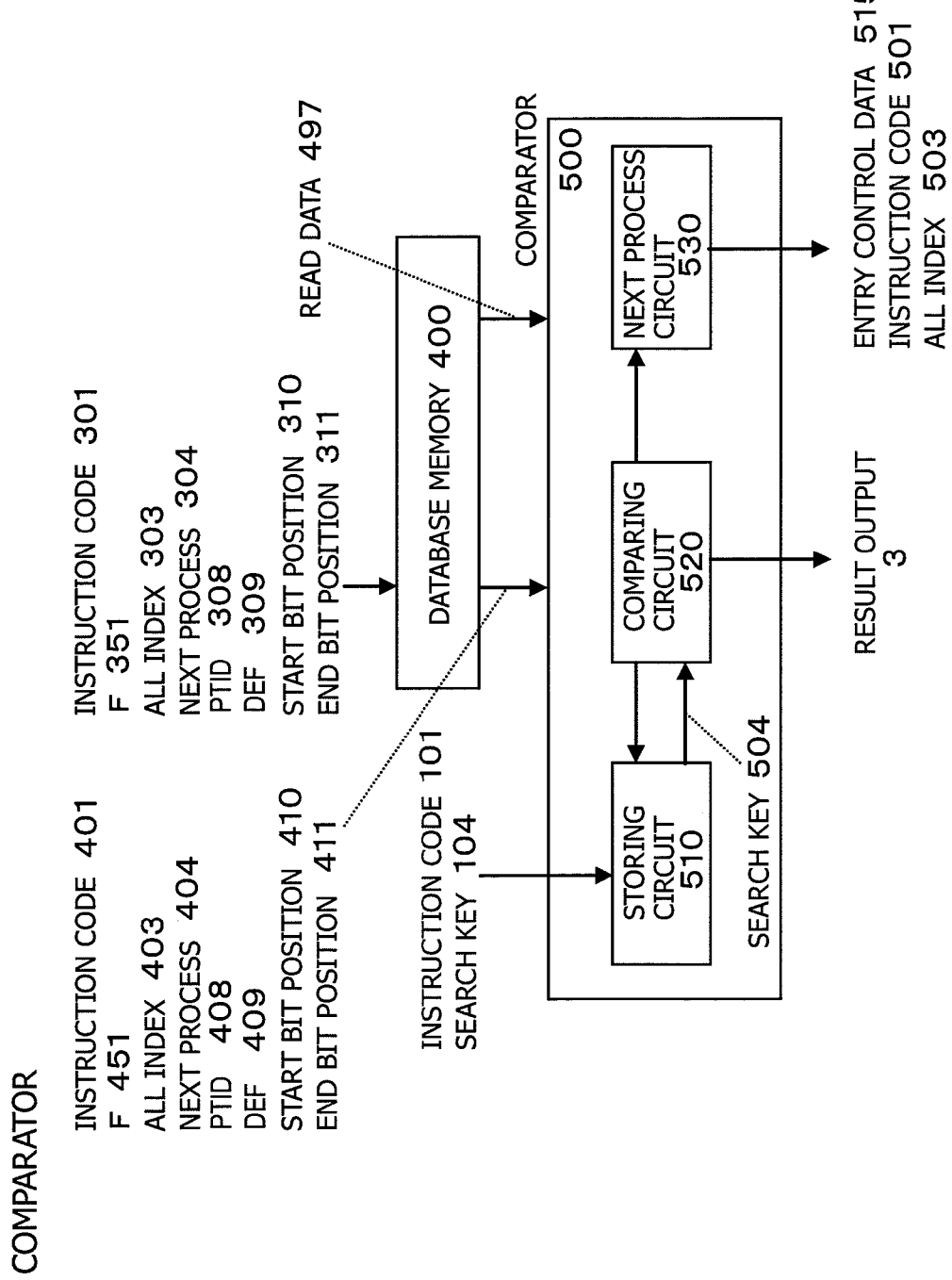
FIG. 8 is a block diagram illustrating a function of comparator 500 configured in the fixed length data retrieving apparatus 10 according to the exemplary embodiment of the present invention.

FIG. 8 illustrates an embodiment of the comparator 500. There are following three systems as the input to the comparator 500.

(1) The instruction code 101 and the search key 104, which are outputs of the retrieving instruction processor 100.

(2) An instruction code 401, the all index 403, the next process 404, a PTID 408, a DEF 409, a start bit position 410, and an end bit position 411, which are the outputs of the database memory 400.

(3) The read data 497, which is the output of the database memory 400.

Outputs of the comparator 500 are a result output 3 comprising the instruction code 401 and a comparison result and the user data or the default data, and an entry control data 515 and an instruction code 501 and an all index 503 to be transferred to the pointer processor 300. As illustrated in FIG. 8, the comparator 500 is configured with a storing circuit 510, a comparing circuit 520, and a next process circuit 530. The storing circuit 510 is a two port memory including a read port and a write port. The write port writes the search key 104 by using the instruction code 101 as an address. The read port reads the stored search key 504 with the instruction code 401 as an address, and transmits the stored search key 504 to the comparing circuit 520.

It has been described that the comparing circuit 520 executes two types of comparisons, which will be described below. First, when the next process 404 is (4) or (6), the read data is the FLD 416 of the format (1). By using the prefix mask 422 incorporated in the FLD 416, the IP address lower (32−n) bits 423 and the search key 504 are compared (comparison 1). The ID 424 of the FLD 416 and the PTID 408 are compared (comparison 2). If the comparison 1 and the comparison 2 include the match result, and the valid bits 421 of the FLD 416 are valid, the match result is obtained. As the comparison result, if a plurality of the FLDs 416 obtains the match result, the FLD 416 including the maximum value of the prefix masks 422 of the FLDs 416 becomes the match result. That is, the match result is the FLD 416 including the maximum m in the matching FLDm. The result output 3 is the user data, the match result, and the instruction code 401 incorporated in the FLD 416. When no FLD 416 matches, and when the DEF is valid, the result output 3 is the DEF, the match result, and the instruction code 401. When no FLD 416 matches, and when the DEF is invalid, the result output 3 is a "no match" result, and the instruction code 401. In the case of the 32 bits IP address, the prefix mask 422 is expressed by five bits. The value is developed in such a 32 bits format the value is the same as the number of is from the MSB. For example, when the prefix mask 422 is 18, the mask to be used for the comparison is developed to 1111 1111 1111 1111 1100 0000 0000 0000. Next, the bits corresponding to the 1 are compared. Likely, a length n (as an example, it is assumed that n is 16) of the index 102 of the pointer table is developed by inverting "0" and "1", and the result obtained by executing the logical AND between the developed n value and the above mask is the mask to be used for the comparison. In this case, if a length n of the index 102 is developed, 0000 0000 0000 0000 1111 1111 1111 1111 is obtained. As a result, 0000 0000 0000 0000 1100 0000 0000 0000 is obtained for the mask to be used for the comparison. By using this mask, the IP address lower (32−n) bits 423, in which the higher bits are 0, and which is developed to a 32 bits format, and the search key 504 are compared.

Next, when the next process 404 is (5), the read data is the FLD 416 of the format (2). In this case, the comparator 500 executes the NVC comparison. The NVC comparison is a calculation in which the compared value 417 of the FLD 416 is subtracted from a value obtained by extracting a part specified by the start bit position 410 and the end bit position 411 from the all index 403. For example, when the start bit position 410 and the end bit position 411 indicate 16 and 31 respectively, a part from bit 15 to bit 0 of the all index 403 is extracted as an unsigned value. In this case, the compared value 417 is the lower 16 bits of the IP address. As described above, the FLD 416 is arranged so that the compared value 417 of the FLD 0 is the minimum, and the compared values 417 become larger for the right direction. According to this example, as a result of the largeness comparison of the value, as described from the FLD 0, the obtained sequence is large, large, large, large, small, and small. In this case, the displacement value 418 of the route table, which is included by the FLD 416 corresponding to [large] just before the value transits from the large to the small, and the MCD 419 are transferred to the next process circuit 530, and are used to read the next route table. That is, the NVC comparison can divide a large number of the FLDs 416 belonging to one entry of the pointer table to groups whose number is the number of the FLDs 416 (64 in the example) of the NVC format 2.

When the next process of the entry data 415 of the read data 497 is (1), the next process circuit 530 transfers a signal of the retrieval termination to the comparing circuit 520, and the comparing circuit 520 outputs the result output 3. When the next process of the entry data 415 is (5) and (6), The displacement value 418 of the route table, which is transferred from the comparing circuit 520, and the index data stored in the entry data 415 of the read data 497 are added, and are substituted to the entry control data 515 to be outputted. In addition, the next process of the entry data 415, the MCD 419, the PTID 408, and the DEF 409 which are transferred from the comparing circuit 520, form the entry control data 515, and the entry control data 515 is outputted. The instruction code 401 and the all index 403 are directly outputted to the instruction code 501 and the all index 503.

Figure 9:
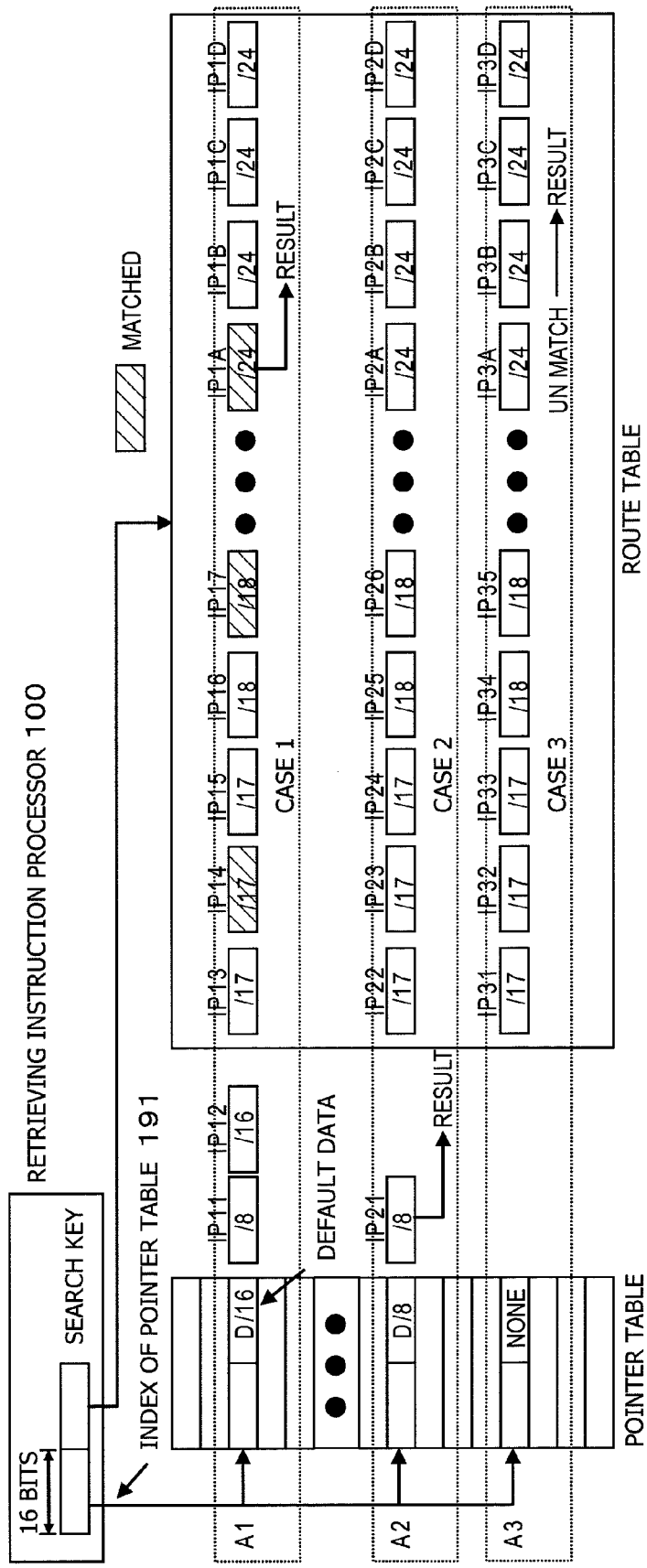
FIG. 9 is a conceptual diagram for retrieving by the LPM rule the IP v4 address configured in the route table according to the exemplary embodiment of the present invention.

The above is the retrieving method for retrieving the route table of the 32 bits IP address by the LPM rule. As summarized by using an example of FIG. 9, the IP addresses belonging to the index A1 (the higher 16 bits of the search key) of the pointer table indicated in a case 1 are indicated as an IP 11, an IP 12, an IP 13, . . . , an IP 1C, and an IP 1D. The prefix mask of each IP address is expressed as /8, /16, /17, . . . . The DEF obtained by reading the index A1 is the user data of the IP 12, and is expressed as a D/16. The FLD 416 stored in the route table corresponds to the IP address whose prefix mask is /17 or more (in the case 1 of FIG. 9, IP 13 to IP 1D). For the IP address whose prefix mask is /16 or less, by the table manager 600, the user data of the IP address, whose prefix mask is the longest in the IP addresses whose prefix mask is /16 or less, is stored in the default data of the entry to be addressed by the index A1. In the case 1 of the described retrieving method, since the IP 14, the IP17, and the IP1A match, the result output 3 becomes the user data of the IP1A, the match result, and the instruction code 401. In a case 2, no FLD 416 matches, but the DEF exists, so that the result output 3 becomes the D/8, the match result, and the instruction code 401. In a case 3, no FLD 416 matches, and no DEF exist, so that the result output 3 becomes a "no match" result, and the instruction code 401.

A method for grouping the FLDs 416 so that the FLDs 416 can be compared all together is a necessary condition of the present invention and can be enough realized by utilizing the SPT and the LT. That is, in an example that the 32 FLDs 416 are stored in the database memory 400, if an index length of the pointer table is specified to be 17 bits (bit 31 to bit 15 of the search key), the displacement of the SPT is specified to be six bits (bit 14 to bit 9 of the all index), and the displacement of the LT is specified to be four bits (bit 8 to bit 5 of the all index), the entry of the LT can store all the IP addresses belonging to the entry. Thus, the segmenting function of the present invention sufficiently functions Next, the retrieving method for retrieving the route table of the 128 bits IP address (IP v6) by the LPM rule will be described. Since the retrieving operation is basically the same as that of the IP v4, only the difference will be described. There are two differences. One is that the pregroup circuit 110 functions so that the 128 bits IP address can be more efficiently segmented. The other is that the formats of the entry data of the point table and the FLD 416 are different depending on an output of the pregroup circuit 110. As focusing on the different points, the retrieving method for retrieving the 128 bits IP address will be sequentially described.

[Retrieving Instruction Processor]

In FIG. 3, the pregroup circuit 110 includes m units of sub-comparing circuits 115 incorporating a programmable register R and a sub-comparator, a selector 116, and connector 117. The pregroup circuit 110 is a circuit to which n bits of the search key and the search key are inputted, and which outputs the index 102 of the pointer table and the F151. As illustrated in FIG. 3, the register R stores a sub-group, a sub-mask, a PT base, an F, a PT start, and an end. The sub-mask is a mask including a maximum of n pieces of 1s from the highest bit. The number of the 1s is referred to as a length of the sub-mask. The function is to compare the bits corresponding to the 1 of the sub-mask with the sub-comparator. By using the sub-mask, the n bits of the search key is compared with the sub-group stored in the register. Such an operation is executed in all the sub-comparing circuits 115. The PT base, the F, the PT start, and the end of the matching sub-comparing circuits 115 are selected and are outputted by the selector 116. The m units of sub-comparing circuits own priority orders, and when a plurality of the sub-comparing circuits 115 are matched, the above parameters in the register of the matching sub-comparing circuits 115 whose priority order is the highest are outputted. When the matching sub-comparing circuits 115 does not exist, the above parameters of the sub-comparing circuits 115 whose priority order is the lowest are outputted. The above outputted parameters excluding the F are inputted to the connector 117, and the index 102 of the pointer table is outputted. The F is outputted from the selector 116, and directly from the retrieving instruction processor (F 151). The function of the connector 117 will be described. The bits of the search key between the PT start and the end are extracted, and data 1 is generated, whose lower data is specified to be such bits and whose length is a length of the index of the pointer table. The higher-order data of the data 1 is "0". Data 2 is generated, whose higher-order data is specified to be the PT base and whose length is the length of the index of the pointer table. The lower data of the data 2 is "0". The logical OR between the data 1 and the data 2 is the index 102 of the pointer table. When n+1 is specified as the PT start, the F is "1", and in the case of other value, the F is "0".

[Pointer Table Memory]

When the route table of the 128 bits IP address is retrieved, a format of the entry data of the pointer table stored in the pointer table memory 200 is different depending on a value of the F 151. When the F 151 is "1", the format is the same as that of the 32 bits IP address, and when the F 151 is "0", the PTID and the default data are unnecessary.

[Pointer Processor]

When the F 151 is "1", a function of the pointer processor 300 is the same as that of the retrieval of the 32 bits IP address. When the F 151 is "0", since the entry data does not store the PTID and the default data, the PTID 308 is outputted with "0", and the DEF is outputted with an invalid bit.

[Database Memory]

In the retrieval for the 128 bits IP address, a format of the read data of the database memory 400 is different depending on a value of the F 351. The formats are illustrated in FIG. 7. When the F 351 is "1", the format is the same as that of the retrieval of the 32 bits IP address as excluding a length of the IP address. In this case, the p of the IP address lower (128–p) bits is expressed as (a length of the sub-mask)+(a difference between the PT start and the end)+1. It is assumed as an example in the following description that the p is 23. When the F 351 is "0", the 128 bits IP address is stored, and the ID is deleted. The prefix mask is expressed by seven bits.

[Comparator]

In the comparator 500, the differences from the format of the retrieval of the 32 bits IP address is that a length of the format of the developed prefix mask 422 is not 32 bits, but 128 bits. For example, when it is 49, the mask to be used for the comparison is developed in a hexadecimal format to FFFF FFFF FFFF 8000 0000 0000 0000 0000. When an F 451 is "1", since the p is 23, the p is likely developed by inverting "0" and "1", and the result obtained by calculating a logical AND between the developed p and the above mask is the mask to be used for the comparison. In this case, the p is developed in a hexadecimal format to 0000 01FF FFFF FFFF FFFF FFFF FFFF FFFF. As a result, 0000 01FF FFFF 8000 0000 0000 0000 0000 is obtained as the mask to be used for the comparison. By using this mask, the IP address lower (128–p) bits 423, whose higher-order bits are "0", and which is developed in the 128 bits format, is compared with the search key 504. The determination of the result output 3 is the same as that of the retrieval of the 32 bits IP address. When the F 451 is "0", by using only the developed prefix mask, the IP address 128 bits 423 is compared with the search key 504. The determination of the result output 3 is different from that of the retrieval of the 32 bits IP address. Since the DEF 409 is invalid, when the comparison result is a "no match", the "no match" result is outputted to the result output 3.

The above is the retrieving method for retrieving the route table of the 128 bits IP address by the LPM rule. As summarized, by using the pregroup circuit 110 of the retrieving instruction processor 100, the route table of the 128 bits IP address is segmented with the large groups. Each of the large groups is segmented by the pointer table corresponding to the large group. This pregroup circuit 110 can be used to retrieve the route table of the 32 bits IP address. However, as described above, since the sufficient segmentation can be executed by utilizing the SPT and the LT, a method for using the pregroup circuit 110 will not be described. A method for grouping the FLDs 416 so that the FLDs 416 can be compared all together is a necessary condition of the present invention and can be enough realized by utilizing the SPT, the LT, and also the NVC method. For example, as the worst case, even when all the 128 bits IP addresses belong to one entry of the pointer table, eight millions units of the 128 bits IP addresses can be retrieved by repeating the NVC method three times. Thus, the function for the segmentation of the present invention sufficiently works. When the database memory is read, by continuously executing a plurality of the readings, the 32 FLDs 416 can be read to be compared all together.

Regardless of a length of the IP address, it can be also considered that the FLD 416 of the IP address corresponding to the DEF maintained by the pointer table is stored in the route table. However, the FLDs 416 of the route table are increased, and a large number of the same FLDs 416 are stored. This is a problem for its inefficiency.

Next, the retrieving method for retrieving the ACL table will be described. When retrieving the ACL table, a length of the IP address is not related to the retrieving method. Thus, the 32 bits IP addresses will be described as an example. As described above, the ACL table is configured with the ACL table 1 and the ACL table 2. Both tables are stored in the database memory. The basic of the retrieving method for retrieving the ACL table is to segment the number of pieces of the fixed length data of the ACL table by first retrieving the ACL table 1. Next, the ACL table 2 is retrieved by using the after-mentioned segmenting technique.

Figure 10:
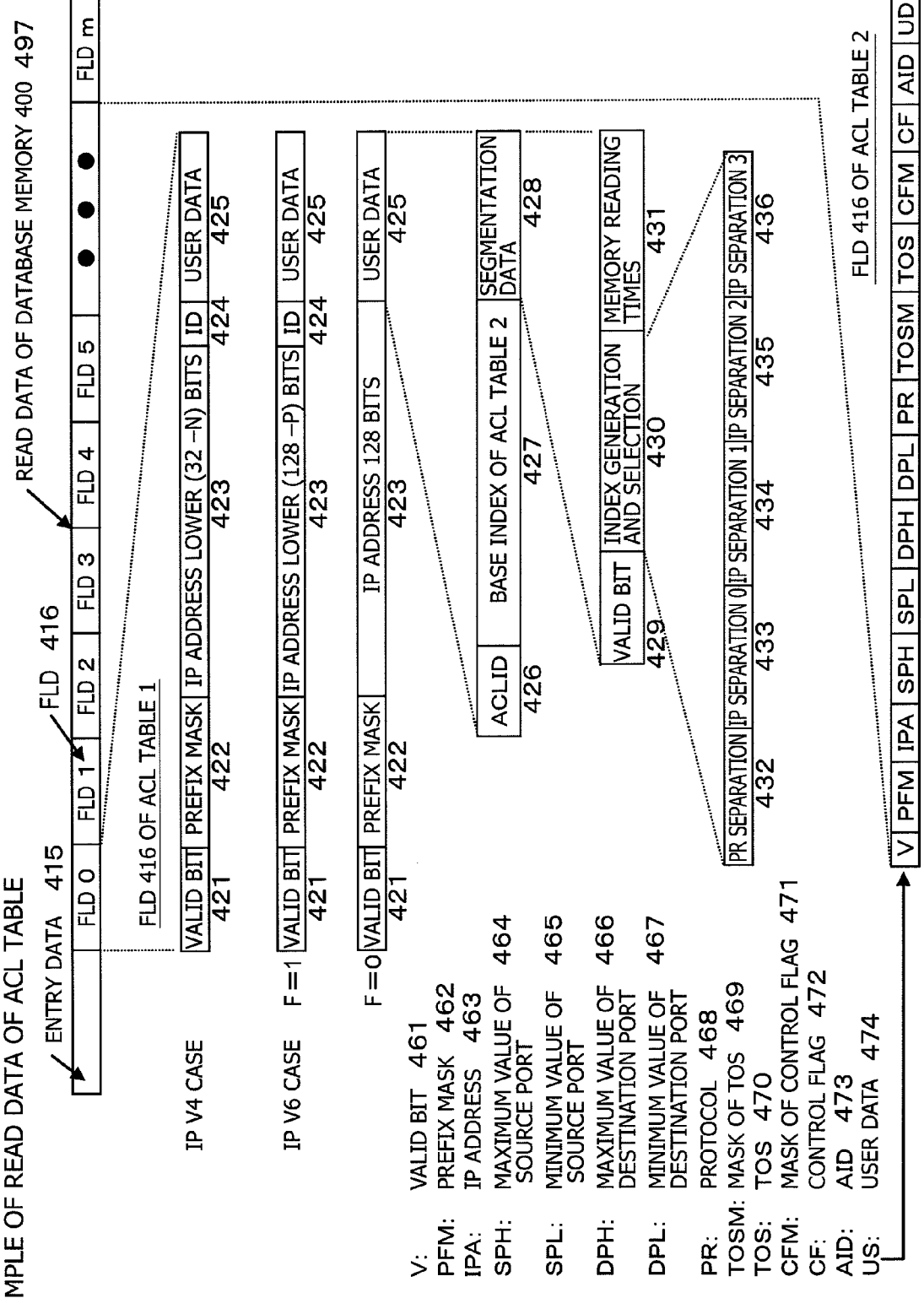
FIG. 10 is a diagram illustrating contents of the ACL table 1 and the ACL table 2 according to the exemplary embodiment of the present invention.

FIG. 10 illustrating the FLD 416 configured in the ACL table 1 and the ACL table 2. The configuration of the FLD 416 of the ACL table 1 is completely the same as that of the route table. The user data of the FLD 416 is divided to an ACL ID 426, a base index 427 of the ACL table 2, and a segmentation data 428. The FLD 416 of the ACL table 2 will be described in detail. The FLD 416 is configured with valid bit (V) 461, a prefix mask (PFM) 462, an IP address (IPA) 463, a maximum value (SPH) 464 of a source port, a minimum value (SPL) 465 of the source port, a maximum value (DPH) 466 of a destination port, a minimum value (DPL) 467 of the destination port, a protocol (PR) 468, a mask of TOS (TOSM) 469, a TOS 470, a mask of a control flag (CFM) 471, a control flag (CF) 472, an AID 473, and a user data (UD) 474. If the ACL table 1 stores the source IP address, the IPA of the ACL table 2 is the destination IP address, and if the ACL table 1 stores the destination IP address, the IPA of the ACL table 2 is the source IP address.

When the ACL table is retrieved, the ACL table 1 is first retrieved according to the LPM rule. The retrieving method for retrieving the ACL table 1 has been described above. Thus, the description will be started from the comparator 500 for processing the retrieval result of the ACL table 1.

[Comparator]

When the FLD 416 of the ACL table 1 and the search key 1 match with each other, the user data of the matching FLD 416 is obtained, or when the FLD 416 of the ACL table 1 and the search key 1 do not match with each other, and the DEF is valid, the DEF (including the same format as the user data) is obtained. When the FLD 416 of the ACL table 1 and the search key 1 do not match with each other, the "no match" result becomes the result output. Attention should be paid to retrieving the ACL table 1 so that the next process of the entry control data obtained by reading the ACL table 1 is (1) when the comparison result of the roué table is obtained, but is (7) when the comparison result of the ACL table 1 is obtained (refer to FIG. 5). The function is as follows: when the comparison result is a "no match", the "no match" result is outputted, and the process is terminated; and when the comparison result is a match, the retrieval for the ACL table 2 is executed. The base index 427 of the ACL table 2 for reading the ACL table 2 is obtained from the user data or the DEF obtained by retrieving the ACL table 1. The index of the ACL table 2 is obtained by substituting the bits generated by the segmentation data 428 to the lower bits of the index. When valid bit 429 of the segmentation data 428 is invalid, the obtained base index 427 of the ACL table 2 is the index of the ACL table 2. When the valid bit 429 is valid, this condition means that the FLDs 416, which are more than possible to be compared all together, are included in the ACL table 2 to be read. The segmentation data 428 provides a means for comparing the FLDs 416 all together. FIG. 10 illustrates an example of the segmentation. In FIG. 10, the segmentation data 428 is an index generation and selection 430 and a memory reading times 431. A more understandable method will be first described. In the memory reading times 431, if it is assumed that P units of the FLDs 416 stored in the ACL table 2 are obtained by reading the ACL table 2 one time, as the memory is continuously read more times, the number of the FLDs 416, which can be compared, becomes more such as 2P, 3P, and 4P. For this object, the number of times for reading the ACL table 2 is determined from the memory reading times 431. The index generation and selection 430 is for example, configured with a PR separation 432, an IP separation 0 (433), an IP separation 1 (434), an IP separation 2 (435), and an IP separation 3 (436). As described above, the search key is stored in the storing circuit 510 of the comparator 500. The stored protocol and the stored IP address of the search key corresponding to the protocol and the IP address configured in FLD 416 of the ACL table 2 are read, and the stored protocol is decoded, and bits specified by the above data are extracted from the stored IP address. When the PR separation 432 is valid, as a result of the decoding by the storing protocol, if the result is, for example, the TCP, the bit 4 of the base index 427 of the ACL table 2 is set to "1", and otherwise, the bit 4 is set to "0". While each of the IP separation 0 (433), the IP separation 1 (434), the IP separation 2 (435), and the IP separation 3 (436) is configured with a valid bit and a bit position, when each valid bit is valid, the bit specified by each bit position is extracted from the stored IP address, and the extracted bits are sequentially substituted to the bit 0, the bit 1, the bit 2, and the bit 3 of the base index 427 of the ACL table 2. As described above, the number of the FLDs 416 of the ACL table 2, the FLDs 416 being to be read by the base index 427 of the ACL table 2 without the segmentation, can be segmented to five bits, 32 divisions by processing with the index generation and selection 430. While the number of the FLDs 416 is not actually equally divided, it is enough efficient to segment the number of the FLDs 416 by using the above memory reading times 431 at the same time.

Next, by using the base index 427 of the ACL table 2 obtained after the segmentation, the entry control data 515 for reading the ACL table 2 is outputted to the pointer processor 300 with the instruction code 501. The invalid data is transferred to the all index 503. In this case, the outputted next process is (6), and the MCD causes all the memory arrays to be able to be read.

[Pointer Processor and Database Memory]

The pointer processor 300 executes the described process, outputs the instruction code 301, the next process 304, the RTIX 306, and the MCD 307 to the database memory 400, and reads the ACL table 2.

[Comparator]

Like the retrieval for the route table, the FLD 416 of the read data 497 of the ACL table 2 is processed by the comparing circuit 520, and the entry data 415 is processed by the next process circuit 530. The next process of the entry data 415 is (1). When the memory is continuously read a plurality times, the same entry data 415 is used. The read FLD 416 is compared with the search key which is stored in the storing circuit 510, and is read. The FLD 416 of the ACL table 2 will be described in detail by using the abbreviation, and referring to FIG. 10. A word "stored" is attached to the beginning of the read search key part, such as the "stored IP address". The PFM 462 and the IPA 463 of the FLD 416 are compared with the stored IP address (comparison 1). The PFM 462 is five bits (seven bits), and is developed by the method described in the LPM rule. The IPA 463 is compared with the stored IP address by using the developed mask. The IPA 463 is compared for all the 32 bits (128 bits), the number of the bits corresponds to the case of the IP v4, and the number in the brackets corresponds to the case of the IP v6. The stored source port is compared with the SPH 464 and the SPL 465 (comparison 2). When a value of the stored source port is between the SPH 464 and the SPL 465, it is acknowledged that the stored source port matches. The stored destination port is compared with the DPH 466 and the DPL 467 (comparison 3). When a value of the stored destination port is between the DPH 466 and the DPL 467, it is acknowledged that the stored destination port matches. The stored protocol is compared with the PR 468 (comparison 4). The stored TOS is compared with the bits of the unmasked TOS 470 by using the TOSM 469, which is a mask of the TOS (comparison 5). The stored control flag is compared with the bits of the unmasked CF 472 by using the CFM 471, which is a mask of the CF (comparison 6). The ACL ID 426 and the AID 473 of the user data 425 are compared (comparison 7). When all the comparison results from the comparison 1 to the comparison 7 are the matches, it is determined that the FLD 416 matches with the search key. When the number of the FLDs 416, which matches with the search key, is two or more, the result output 3 is the UD 474 of the FLD 416, whose priority order is the highest in such FLDs 416, the match result, and the instruction code 401. When no FLD 416 matches with the search key, the result output 3 is a "no match" result and the instruction code 401. This is an important point for the present invention. A comparing method for comparing the ACL ID 426 and the AID 473 will be described in detail. The formats of the ACL ID 426 and the AID 473 are the same as each other. The ACL ID 426 is configured with a match ID and an range ID. When the read data 497 includes a plurality of different groups, the match ID is compared to distinguish the groups. If the range ID of the ACL ID 426 is equal to or more than a value of the range ID of the AID 473, it is determined that the ACL ID 426 and the AID 473 matches with each other. The reason for this will be described. The FLD 416 of the group, which is stored in the ACL table 2, and is segmented, belongs to the IP address matched by retrieving the ACL table 1. However, a plurality of the matching IP addresses may exist. It is assumed that such IP addresses are an IP0, an IP1, an IP2, and an IP3, and a prefix mask length of such an IP address becomes longer in order of the IP0, the IP1, the IP2, and the IP3. In the retrieval for the ACL table 1, when the IP3, whose prefix mask length is the longest, is selected, all the FLDs 416 belonging to this group are compared. However, in the retrieval for the ACL table 1, when the IP2 is selected, it is necessary to remove the FLDs 416 relating to the IP3 from the FLDs 416 to be compared. Thus, for realizing such a process, "3" is, for example, assigned to the range ID of the FLDs 416 relating to the IP3. Likely, "0", "1", and "2" are assigned to the range IDs of the FLDs 416 relating to the IP0, the IP1, and the IP2 respectively. If the ACL ID 426 and the AID 473 are set as described above, in the retrieval for the ACL table 1, when the IP3 is selected, since the range ID of the ACL ID 426 of the IP3 is "3", the AID 473 of all the FLDs 416 in the group, whose range ID of the AID 473 is "3" or less, matches. When the IP1 is selected, since the range ID of the ACL ID 426 of the IP1 is "1", the FLDs 416, whose range ID of the ACL ID 426 in the group is "0" and "1", are compared.

As described above, the ACL table can be retrieved by retrieving the ACL table 2 following the retrieval for the ACL table 1. This method can be applied to other process. For example, it is apparent that the ACL table can be retrieved by retrieving the ACL table 1 configured with the source IP address, retrieving the ACL table 2 configured with the destination IP address with the above result, retrieving the ACL table 3 configured with the source port and the destination port with the above result, and retrieving the ACL table 4 configured with the protocol, the TOS, and the control flag with the above result. However, the longer retrieval time is a fault.

[Table Manager]

Next, a function of the table manager 600 will be described. The table manager 600 is basically configured with a processor and a memory storing a program thereof. The pointer table memory 200 and the database memory 400 are mapped to an address space in which the processor can access. A write operation and a read operation are executed from the processor to both of the memories by using the write and read address and control signal (293 and 493) and the write and read data (294 and 494) (FIG. 4). The table manager 600 is provided with an interface (illustrated by the dash line) for reading an execution condition of the table managing instruction 2 maintained in the retrieving instruction processor 100, the pointer processor 300, and the comparator 500.

For realizing a retrieving method for retrieving the route table and the ACL table according to the present invention, a variety of conditions are necessary to compose such tables. A role of the table manager 600 is to realize such conditions. A function of the table manager 600 for satisfying such conditions will be described by way of the composition of each table.

First, a method for composing the route table of the 32 bits IP address will be described. It is to be noted that, the method is also basically the same in the case of the 128 bits IP address. The route table is composed by a routing function in a network. Thus, the table managing instruction 2 of the route table comprises an adding instruction and a deleting instruction for one IP address. The table managing instruction 2 for setting an initial condition, and the like is not related to the present invention, so that the description will be omitted. The table managing instruction 2 and the retrieving instruction 1 are distinguished from each other by the instruction code. While being processed by the table manager 600, at the same time, the adding instruction and the deleting instruction for the IP address are processed by the retrieving instruction processor 100, and the retrieval is executed. However, the retrieval with the instruction codes of the adding instruction and the deleting instruction for the IP address stores parameters which are provided in the retrieval process, and are necessary to execute the table managing instruction 2. The result output 3 is not outputted. As an example of the necessary parameters, the retrieving instruction processor 100 stores the index and the all index of the pointer table, the pointer processor 300 stores the index of the route table and the index of the SPT, the comparator 500 stores the comparison result, and a position of the matching FLD 416 stored in the read data 497 when matching, the result of the NVC comparison and a position of the selected FLD 416 in the case of the NVC comparison, and the result of the prefix length comparison and a position of the selected FLD 416 in the case of the prefix length comparison, and the like. The table manager 600 executes the adding instruction and the deleting instruction for the IP address by using such parameters. The adding or deleting operation for the IP address depends on the prefix length of the added or deleted IP address. When the prefix length of the added or deleted IP address is equal to or less than the index length (m) of the pointer table, the adding or deleting operation is processed for the pointer table, and when the prefix length is equal to or more than m+1, the adding or deleting operation is processed for the route table. The pointer table and the route table will be described in detail. The read data of the pointer table, which is addressed by the index of the pointer table stored in the retrieving instruction processor 100, includes the index of the route table, which is stored in the pointer processor 300. The prefix length of the IP address read by the index of the route table is equal to or more than m+1, and the higher m bits of the IP address are naturally the same as the index of the pointer table. When the default data is valid, the default data is the user data of the IP address whose prefix length is the longest in the IP addresses whose prefix length is equal to or less than m. In the IP address whose prefix length is equal to or less than m, the higher m bits of the IP address is compared and is matched with the index of the pointer table by using the prefix mask of the IP address. When composing the route table in which the default data is invalid, it may be necessary to store all the IP addresses whose prefix length is equal to or less than m, or the IP address whose prefix length is the longest in the route table. In this case, it is necessary to write the two to the (m−the prefix length)-th power pieces of the same IP addresses in the route table, so that something useless is induced. This case will be described as an example. It is assumed that the search key is 12345678 (hexadecimal format). The index of the pointer table is 1234. Thereby, the prefix length of the IP address obtained by reading the route table is equal to or more than 17, and is 1234xxxx. The x is a value from 0 to F. In addition to such an IP address, in this example, when there are the IP addresses whose prefix length is 8 and 12, that is, there are the IP addresses 12xxxxxx and 123xxxxx (x is a value from 0 to F) in a hexadecimal format, the user data of the IP address 123xxxxx is the default data, and is stored in the default data of the location 1234 of the pointer table. When composing the route table in which the default data is invalid, the IP address 123xxxxx is stored in the route table which is read by the index 123x of the pointer table, and is addressed by the index of the route table (writing the 16 same IP addresses). If necessary, the IP address 12xxxxxx is stored in the route table which is read by the index 12xx of the pointer table (writing the 256 same IP addresses).

The description will be returned to the addition and deletion function. When the pointer table whose default data is valid is processed, it is assumed as an example that the index length of the pointer table is 16, and the prefix length of the IP address to be added or deleted is 8. In this example, the context of the route table included by the table manager 600 is changed, and also, the default data of the entry of pointer table is processed. A maximum of the number of pieces of the default data to be changed is 256. As described above, the pointer table memory 200 uses a memory whose data width is wide. By using this memory, the writing and reading circuit 299 is provided with such a function that a plurality of the entries can be processed all together. For example, if it is assumed that a bus width of the data bus 292 of the memory array 291 is 576 bits, the eight entries can be processed all together. In this case, it is enough that the table manager 600 provides the pointer table memory 200 with the write data (default data), the mask, and the write address. By using a filling order 610 illustrated in FIG. 11, the pointer table can be changed by the 32 writing instructions for a maximum of 256 times of the writings, so that the table managing instruction can be executed at a high rate.

Figure 11:
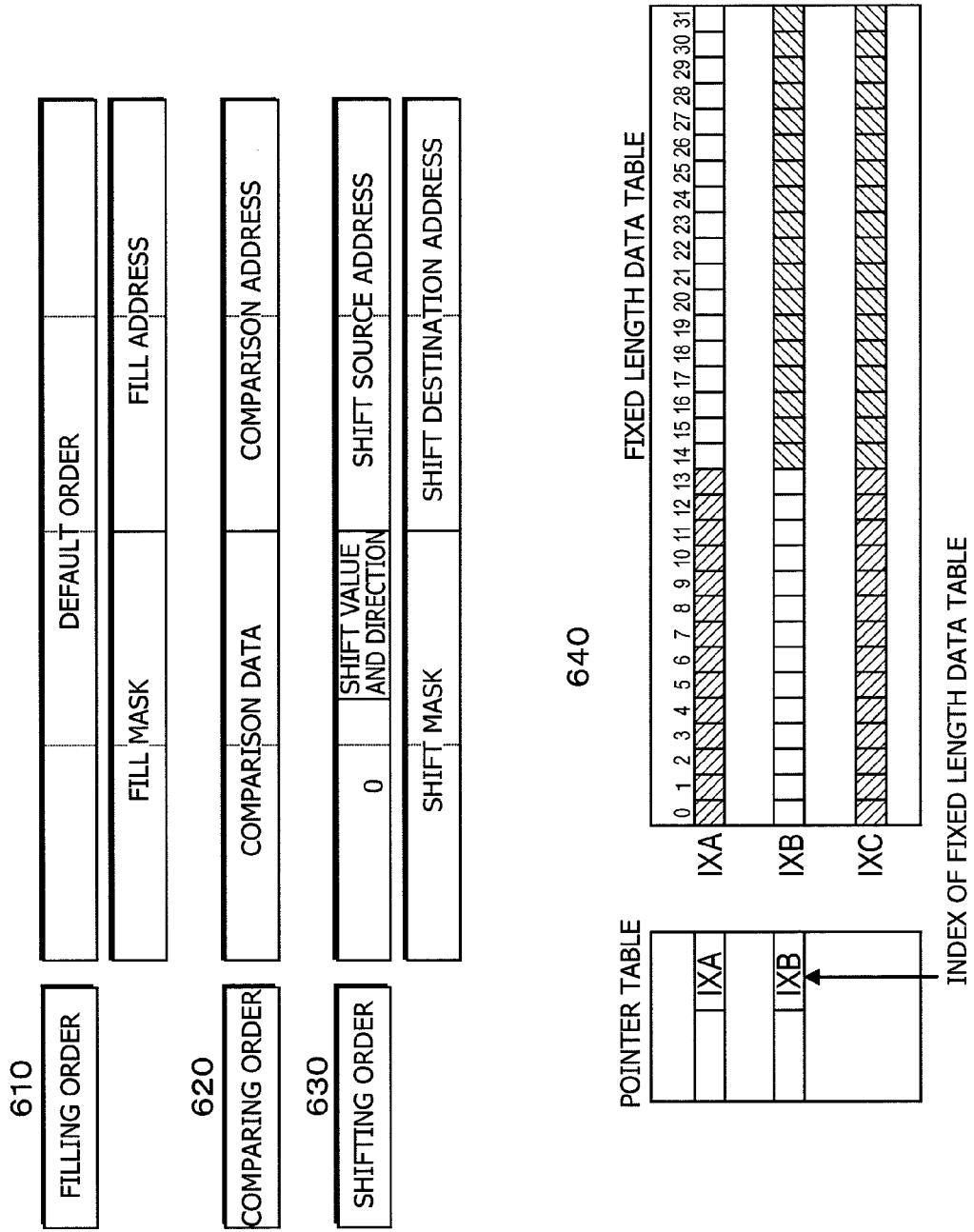
FIG. 11 is a diagram illustrating a format of an order issued by table manager and a pairing method.

When the prefix length of IP address to be added or deleted is 18, the route table is corrected. When matched in the retrieval, the table manager 600 changes the user data for the adding instruction by using the index of the route table maintained by the pointer processor 300 and the position information of the FLD 416 maintained by the comparator 500. The table manager 600 deletes the matching FLD 416 for the deleting instruction by using the information maintained by each means. When unmatched in the retrieval, the table manager 600 executes nothing for the deleting instruction. When unmatched in the retrieval for the adding instruction, and when the read data 497 read by the index of the route table maintained by the pointer processor 300 includes a space for storing the FLD 416 to be added, the table manager 600 issues a comparing order, which compares the prefix length of the FLD 416 stored in the index of the route table, to the database memory 400, and obtains the position of the FLD 416 to be added as the comparison result. A comparing order 620 is illustrated in FIG. 11. The table manager 600 issues a shifting order for reading and shifting the FLD 416. A shifting order 630 is illustrated in FIG. 11. The shifting order 630 is configured with a shift value, a shift direction, a shift mask, a shift source address (read address), and a shift destination address (write address). As a result of the shifting operation, the FLD 416 to be added is written in the vacated location. If there is no location where the FLD 416 to be added is stored, the FLD 416 to be added is processed according to either of the two following cases. First, that all the locations are occupied by the FLDs 416 belonging to the same group, and second, that all the locations are occupied by the FLDs 416 belonging to a plurality of the same groups. In the former case, the number of reading times is increased, or the LT, or the SPT, or the like is used for segmentation. When the LT is composed, when the index of the LT is generated, and when the used bit positions of the all index matches with the bit position of the prefix mask in the IP address to be added, it is necessary to write the IP address a plurality of times at the location in the LT, When the SPT is composed, it is not necessary to write the IP address a plurality of time unlike the LT. This is because there is the default data. In the latter case, another group, or the group to be added is moved to another address, and the vacated space is generated, the above shifting order 630 is issued, and after that, the FLD 416 to be added is written. After the FLD 416 is added, or is deleted, the relating context of the table manager 600 is corrected. The above description is the function of the table manager 600 for the adding instruction and the deleting instruction issued to the route table.

A function executed by the table manager 600 for the ACL table is simpler than the above-mentioned function executed by the table manager 600 for the route table. The adding and deleting instructions for the ACL table are not basically included. That is, when the ACL table is corrected, all the FLDs 416 that are included in the ACL table are deleted, and all the FLDs 416 to be newly stored are written. Thus, the table management instruction 2 for the ACL table is a composing instruction. The composing instruction transfers the group of the FLD 416 belonging to the entry of the pointer table of the ACL table 1 according to the priority order. Thus, the table manager 600 sequentially writes the transferred FLDs 416 in the ACL table 2 excluding the IP addresses configured in the ACL table 1. The excluded IP addresses are arranged in order of the prefix mask length to be written in the ACL table 1, and the entry of the pointer table of the ACL table 1 is generated. The composing instruction includes a hint which is necessary to compose the ACL table 1 and the ACL table 2. The hint is the number of FLDs 416 for the ACL table 1, and is the number of FLDs 416 and segmentation information (the number of times for reading the memory, the bit position of the IP address of the ACL table 2, and the like) for the ACL table 2. (The hint information can be generated by the table manager 600.)

The table manager 600 includes a resource managing function for increasing a usage efficiency of the fixed length data tables in addition to the above functions for the route table and the ACL table. This function is generally referred to as a pairing technique. In such an example that the read data 497 of the fixed length data table can store the 32 pieces of fixed length data, it is, for example, considered that the two read data 297 of the pointer table store the indexes of the fixed length data table, IXA and IXB respectively, and the 14 pieces of fixed length data and the 18 pieces of fixed length data corresponding to such indexes are stored respectively. This condition is illustrated in FIG. 11. In this case, the data read by the indexes IXA and the IXB of the fixed length data table includes the 18 vacated locations and the 14 vacated locations respectively, and the usage efficiency is very bad. For improving the usage efficiency, for example, the table manager 600 includes a function for storing the above 14 and 18 pieces of fixed length data in the index IXC of the fixed length data table to eliminate the vacated locations. In this case, the IXA and the IXB of the pointer table are changed to the IXC. In the retrieval, the fixed length data belonging to the different groups is compared, so that the wrong comparison result is caused not to be obtained by the ID in the route table, and by the AID in the ACL table. While the method for eliminating the vacated location has been described for the two groups, in this example, the vacated location may be eliminated in the two to a maximum of 32 groups.

The function of the table manager 600 can be moved from the fixed length data retrieving apparatus 10 to external means. In this case, it is necessary that the FLD 416 to be written is generated outside and is written with a simple memory writing function, including the composition in the pointer table stored in the pointer table memory 200 and in the route table and the ACL table stored in the database memory 400. In the consideration of the retrieving for the FLD 416 to be added, it needs much time for the fixed length data retrieving apparatus 10 with the external means of the table manager 600 to execute the adding instruction and the deleting instruction.

Figure 12:
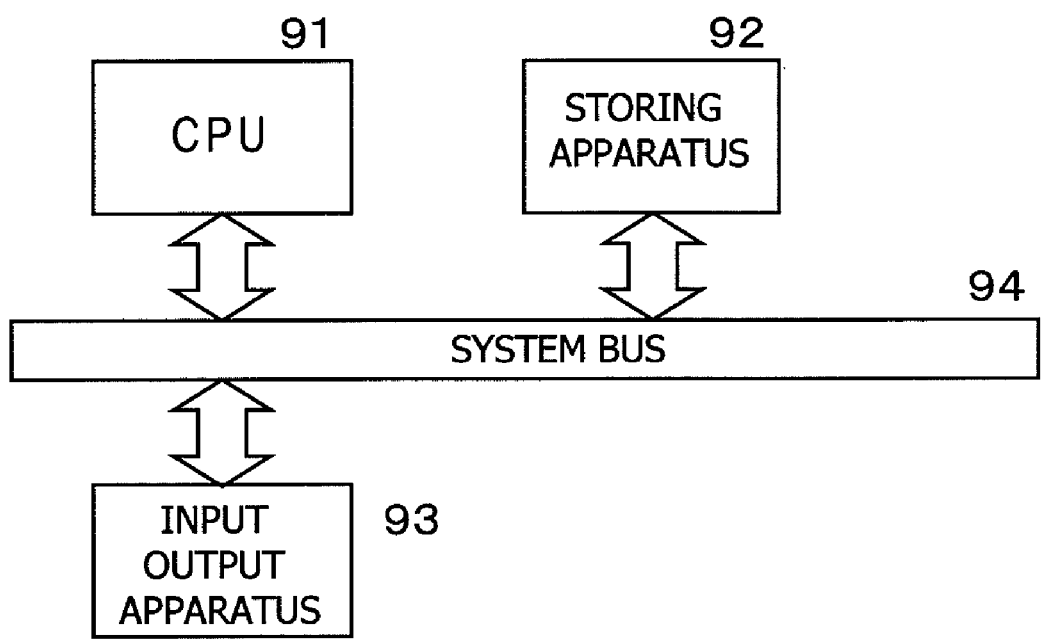
FIG. 12 is a block diagram illustrating an exemplary configuration of a computer system to which a computer program of the present invention and a recording medium according to the exemplary embodiment of the present invention can be applied.

FIG. 12 illustrates a block diagram illustrating an exemplary configuration of hardware to which a computer program of the present invention and a recording medium can be applied. In FIG. 12, a computer system 90 includes a CPU (Central Processing Unit) 91 connected to a system bus 94, a storing apparatus 92, and an input output apparatus 93. The CPU 91 is provided with at least a calculating apparatus and a controlling apparatus, and the storing apparatus 92 is, for example, configured with an incorporated main storing memory, a hard disk drive, a Floppy (Registered trade mark) disk drive, and the like. When the computer program of the present invention is installed in the computer system 90, the computer program is stored in the hard disk drive, and is loaded to the main storing memory according to necessity. The pointer table memory, the database memory, and the like of the present invention are configured with the main storing memory of the storing apparatus 92 or a cache memory provided in the CPU 91. The input output apparatus 93 is provided with a plurality of ports, and can communicate data with outside. The computer program is, for example, read from the recording medium in which the computer program of the present invention is recorded by the hard disk drive, the Floppy (Registered trade mark) disk drive in the storing apparatus 92, or the like.

As described above, some exemplary embodiments according to the present invention have been described in detail. It may be apparent for those skilled in the art that such embodiments can be improved in a variety of manners without substantially departing from the new disclosure and effect of the present invention. Thus, it is intended that all of such improvements may be also included in the scope of the present invention.

What is claimed is:

1. A fixed length data retrieving apparatus, comprising:
retrieving instruction processor that executes a specified process for an inputted retrieving instruction including an instruction code expressing an instruction for a retrieval and a search key for providing an output, wherein the search key is the same data as fixed length data that is to be searched for, and wherein the retrieving instruction processor outputs an index of a pointer table by using a higher m bit or bits of the search key;
a pointer table memory for storing the pointer table to be read by using, as an index, an output value from the retrieving instruction processor or pointer processor;
the pointer processor to execute a specified process by using a pointer value outputted from the pointer table memory, the output of the retrieving instruction processor, and a comparison result outputted from comparator to output an address corresponding to the search key;
a database memory for storing a fixed length data table, which is addressed by an output of the pointer processor, maintaining at least any data of data necessary for the retrieval corresponding to fixed length data or data which is necessary for the retrieval, and many pieces of the fixed length data;
the comparator to compare a plurality of pieces of the fixed length data stored in the fixed length data table and the search key of the inputted retrieving instruction by a specified method, and when the comparison result is a match, outputting a match result and user data of the matching fixed length data as a retrieval result; and
table manager for changing the pointer table and the fixed length data table for an inputted table management instruction.

2. The fixed length data retrieving apparatus according to claim 1,
wherein, in all the pieces of the fixed length data composing the fixed length data table, only bits indicated by a prefix mask associated with the fixed length data in an index (m bits in length) of the pointer table and higher order m bits of the fixed length data are compared, and the matching fixed length data is selected, and all the pieces of the matching fixed length data are stored in the fixed length data table, or the matched fixed length data whose length of the prefix mask is equal to or more than m+1 is stored in the fixed length data table, and the fixed length data whose length of the prefix mask is the largest in the matching fixed length data whose length of the prefix mask is equal to or less than m is stored in the fixed length data table.

3. The fixed length data retrieving apparatus according to claim 1, wherein, when the comparison result is a "no match", and the default data exists at an output of the pointer table, the comparator outputs an match result and the default data as the retrieval result, and when the comparison result is a "no match" and the default data does not exist at the output of the pointer table, the comparator outputs a "no match" result as the retrieval result.

4. The fixed length data retrieving apparatus according to claim 3, wherein, in all the pieces of the fixed length data composing the fixed length data table, only bits indicated by a prefix mask belonging to the fixed length data in an index (m bits in length) of the pointer table and higher m bits of the fixed length data are compared, and the matching fixed length data is selected, and the matching fixed length data whose length of the prefix mask is equal to or more than m+1 is stored in the fixed length data table, and the user data of the fixed length data whose length of the prefix mask is the largest in the matching fixed length data whose length of the prefix mask is equal to or less than m is stored as the default data in the pointer table.

5. The fixed length data retrieving apparatus according to claim 1, wherein the fixed length data to be retrieved includes a plurality of elements, wherein the database memory comprises a plurality of the fixed length data tables, and wherein the elements are separated to be stored in the fixed length data tables or the elements are separated and grouped to be stored in the fixed length data tables.

6. The fixed length data retrieving apparatus according to claim 1, wherein a plurality of the fixed length data tables are stored in the database memory, and each of the fixed length data tables, except the fixed length data table which is retrieved at the end, stores:

an element which configures a part of a fixed length data;
an index of the fixed length data table to be retrieved next when the element matches;
a parameter for segmenting the number of the elements read by the index; and
an ID for causing the element comparison to be valid.

7. The fixed length data retrieving apparatus according to claim 1, wherein the comparator includes:
outputting means for outputting the retrieval result,
the element of the fixed length data to be retrieved is stored in a plurality of the fixed length data tables, and
the comparator, for a plurality of the fixed length data tables, (1) determines a fixed length data table to be retrieved to designate this fixed length data table as a current fixed length data table, and compares the fixed length data from the current fixed length data table with the search key, (2) when the fixed length data is unmatched with the search key in the comparison, outputs the retrieval result from the outputting means, and when the fixed length data is matched with the search key in the comparison, issues to the pointer processor a reading instruction for reading the fixed length data from the fixed length data table following the current fixed length data table, and further compares the fixed length data from the following fixed length data table read from the database memory according to the reading instruction with a part of the corresponding search key, and (3) repeats from (1) to (2) until the last fixed length data stored in the last fixed length data table is compared.

8. The fixed length data retrieving apparatus according to claim 1, wherein the table manager includes:
maintaining means for maintaining information which is necessary to correct the pointer table and the fixed length data table; and
reading means for reading the maintained information, and
wherein the table manager generates a retrieving instruction with an instruction code corresponding to the inputted table management instruction to execute a processing of the instruction code, and maintains information which is necessary to correct the pointer table and the fixed length data table in the maintaining means in a retrieval executing process.

9. The fixed length data retrieving apparatus according to claim 1, wherein, to correct the pointer table and the fixed length data table, the table manager includes issuing means for issuing a filling order, a shifting order, and a comparing order which utilize structural features owned by the pointer table memory and the database memory in which the pointer table and the fixed length data table are stored.

10. The fixed length data retrieving apparatus according to claim 1, wherein, to maximize the number of pieces of the fixed length data stored in the fixed length data table, the table manager includes:
eliminating means for eliminating a vacated location of the fixed length data table by using a pairing method.

11. A computer-readable non-transitory recording medium that stores a program of set of instructions to cause a computer to function as an apparatus according to claim 1.

12. A fixed length data retrieving method, comprising:
processing a retrieving instruction for executing a specified process for an inputted retrieving instruction configured with an instruction code expressing an instruction for a retrieval and a search key for providing an output, wherein the search key is the same data as fixed length data that is to be searched for, and wherein an index of a pointer table is output by using a higher m bit or bits of the search key;

reading a pointer value from the pointer table by using an output value of the retrieving instruction processing as an index;

processing a pointer for executing a specified process to output an address corresponding to the search key by using the pointer value read from the pointer table and an output value of the retrieving instruction processing;

reading a plurality of pieces of fixed length data from a fixed length data table, which is addressed by an output of the pointer processing, maintaining at least any data of data necessary for the retrieval corresponding to the fixed length data or data which is necessary for the retrieval, and many pieces of the fixed length data; and comparing a plurality of pieces of the fixed length data read from the fixed length data table and the search key of the inputted retrieving instruction by a specified method, and when the comparison result is a match, outputting a match result and user data of the matching fixed length data as a retrieval result.

13. The fixed length data retrieving method according to claim 12, wherein, when the comparison result is a "no match", and default data exists at an output of the pointer table, the comparison outputs the match result and the default data as the retrieval result, and when the comparison result is a "no match", and the default data does not exist at the output of the pointer table, the comparator outputs a "no match" result as the retrieval result.

14. A fixed length data retrieving method, comprising:

processing a retrieving instruction for executing a specified process for an inputted retrieving instruction configured with an instruction code expressing an instruction for a retrieval and a search key for providing an output, wherein the search key is the same data as fixed length data that is to be searched for, and wherein an index of a pointer table is output by using a higher m bit or bits of the search key;

reading a pointer value from the pointer table by using an output value of the retrieving instruction processing as an index;

(1) processing a pointer for executing a specified process to output an address corresponding to the search key by using the pointer value read from the pointer table and an output value of the retrieving instruction processing, or an output value of comparison processing;

(2) reading a fixed length data table, which is addressed by an output of the pointer processing, maintaining at least any data of data necessary for the retrieval corresponding to fixed length data, or data which is necessary for the retrieval, and many pieces of the fixed length data;

(3) comparing a plurality of pieces of the fixed length data stored in the fixed length data table with a part corresponding to the plurality of pieces of the fixed length data of the search key of the inputted retrieving instruction all together by a specified method, and when the comparison is a match, outputting an instruction for reading the next fixed length data table for the processing of the pointer; and repeating the steps from (1) to (3) for a plurality of the fixed length data tables in which elements configured in the fixed length data to be retrieved are stored as the fixed length data for, when the last fixed length data table is read, comparing a plurality of pieces of the fixed length data stored in the fixed length data table with a part corresponding to the fixed length data of the search key of the inputted retrieving instruction all together by a specified method, when the comparison result is a match, outputting a match result and user data associated with the matched fixed length data, and when the comparison result is a "no match", outputting a retrieval result of the "no match".

* * * * *

UNITED STATES PATENT AND TRADEMARK OFFICE
CERTIFICATE OF CORRECTION

| | | |
|---|---|---|
| PATENT NO. | : 8,010,557 B2 | Page 1 of 1 |
| APPLICATION NO. | : 12/140590 | |
| DATED | : August 30, 2011 | |
| INVENTOR(S) | : Watanabe | |

It is certified that error appears in the above-identified patent and that said Letters Patent is hereby corrected as shown below:

Column 12,

Line 8, "the number of is from the MSB" should read --the number of 1s from the MSB--.

Signed and Sealed this
Eighth Day of November, 2011

David J. Kappos
*Director of the United States Patent and Trademark Office*